(12) United States Patent
Jang et al.

(10) Patent No.: US 12,287,684 B2
(45) Date of Patent: Apr. 29, 2025

(54) ELECTRONIC DEVICE INCLUDING HEAT TRANSFER MEMBER

(71) Applicant: Samsung Electronics Co., Ltd., Suwon-si (KR)

(72) Inventors: Kiyoun Jang, Suwon-si (KR); Gisoo Lim, Suwon-si (KR); Changryong Heo, Suwon-si (KR); Gilho Kim, Suwon-si (KR); Juho Song, Suwon-si (KR); Kwanghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 189 days.

(21) Appl. No.: 17/900,306

(22) Filed: Aug. 31, 2022

(65) Prior Publication Data

US 2023/0009308 A1 Jan. 12, 2023

Related U.S. Application Data

(63) Continuation of application No. PCT/KR2022/009847, filed on Jul. 7, 2022.

(30) Foreign Application Priority Data

Jul. 9, 2021 (KR) .................. 10-2021-0090081

(51) Int. Cl.
*G06F 1/16* (2006.01)
*G06F 1/20* (2006.01)

(52) U.S. Cl.
CPC ............ *G06F 1/203* (2013.01); *G06F 1/1643* (2013.01); *G06F 1/1652* (2013.01); *G06F 1/1681* (2013.01)

(58) Field of Classification Search
CPC ...... G06F 1/203; G06F 1/1643; G06F 1/1652; G06F 1/1681
(Continued)

(56) References Cited

U.S. PATENT DOCUMENTS 5,910,883 A * 6/1999 Cipolla ............... F28D 15/0233
361/679.52
5,946,187 A * 8/1999 Cipolla ................... G06F 1/203
361/679.52

(Continued)

FOREIGN PATENT DOCUMENTS

JP 2004/012011 A 1/2004
JP 2004/363600 A 12/2004

(Continued)

OTHER PUBLICATIONS

International Search Report dated Oct. 14, 2022, issued in International Application No. PCT/KR2022/009847.

*Primary Examiner* — Anatoly Vortman
(74) *Attorney, Agent, or Firm* — Jefferson IP Law, LLP

(57) ABSTRACT

The electronic device includes a display including a first area and a second area, a first housing configured to support the first area and to form a first space, a second housing configured to support the second area and to form a second space, a hinge structure configured to foldably connect the first housing and the second housing based on a folding axis to be in a first state in which the first and second areas form substantially a same plane or in a second state in which the first and second areas face each other, and a heat transfer member provided to extend from the first space to the second space through the hinge structure and configured to perform a heat transfer between the first space and the second space.

4 Claims, 23 Drawing Sheets

(58) Field of Classification Search
USPC .................................................. 361/679.46
See application file for complete search history.

(56) References Cited

U.S. PATENT DOCUMENTS

| | | | | |
|---|---|---|---|---|
| 5,992,155 | A * | 11/1999 | Kobayashi | G06F 1/1628 361/679.48 |
| 6,052,280 | A * | 4/2000 | Dilley | G06F 1/203 174/15.2 |
| 6,075,696 | A * | 6/2000 | Progl | G06F 1/203 361/679.52 |
| 6,324,055 | B1 * | 11/2001 | Kawabe | G06F 1/1616 361/705 |
| 7,417,863 | B2 * | 8/2008 | Park | H05K 7/20445 361/679.48 |
| 7,573,710 | B2 * | 8/2009 | Morino | H05K 5/0243 361/679.55 |
| 7,969,739 | B2 * | 6/2011 | Tsunoda | G06F 1/203 361/704 |
| 9,490,860 | B2 * | 11/2016 | Wu | H04B 1/3888 |
| 9,939,672 | B2 * | 4/2018 | Kakuda | G02F 1/133385 |
| 10,120,421 | B1 * | 11/2018 | Hong | G06F 1/1652 |
| 10,403,189 | B2 | 9/2019 | Aurongzeb et al. | |
| 11,272,639 | B2 * | 3/2022 | Yang | G06F 1/203 |
| 11,406,044 | B2 * | 8/2022 | Wu | G06F 1/1616 |
| 11,815,947 | B2 * | 11/2023 | Lee | G06F 1/1637 |
| 2015/0257290 | A1 * | 9/2015 | Lee | H05K 5/0021 361/749 |
| 2015/0362791 | A1 * | 12/2015 | Kakuda | G02F 1/133385 349/61 |
| 2016/0212890 | A1 * | 7/2016 | Jeong | G06F 1/1652 |
| 2016/0334836 | A1 * | 11/2016 | Hong | G06F 1/1681 |
| 2017/0099736 | A1 * | 4/2017 | Jung | H05K 7/20963 |
| 2018/0284856 | A1 * | 10/2018 | Shah | G06F 1/1616 |
| 2019/0041922 | A1 * | 2/2019 | Kurma Raju | H05K 7/2039 |
| 2019/0269034 | A1 | 8/2019 | Stanley | |
| 2019/0354148 | A1 | 11/2019 | Delano et al. | |
| 2020/0245501 | A1 * | 7/2020 | Wu | F28F 3/02 |
| 2021/0068314 | A1 | 3/2021 | Chen | |
| 2021/0091450 | A1 | 3/2021 | Park et al. | |
| 2021/0141419 | A1 | 5/2021 | Wang et al. | |

FOREIGN PATENT DOCUMENTS

| | | |
|---|---|---|
| KR | 10-2020-0070336 A | 6/2020 |
| KR | 10-2002-00129872 A | 11/2020 |
| KR | 10-2020-0129872 A | 11/2020 |
| KR | 10-2020-0129880 A | 11/2020 |
| WO | 2023/2377 A1 | 11/2020 |

* cited by examiner

ELECTRONIC DEVICE INCLUDING HEAT TRANSFER MEMBER

CROSS-REFERENCE TO RELATED APPLICATION(S)

This application is a continuation application, claiming priority under § 365(c), of an International application No. PCT/KR2022/009847, filed on Jul. 7, 2022, which is based on and claims the benefit of a Korean patent application number 10-2021-0090081, filed on Jul. 9, 2021, in the Korean Intellectual Property Office, the disclosure of which is incorporated by reference herein in its entirety.

BACKGROUND

1. Field

The disclosure relates to an electronic device including a heat transfer member.

2. Description of Related Art

Currently, electronic devices are being transformed from a uniform rectangular shape to a shape that includes various designs and functions to meet purchase desires of customers. For example, a foldable type of an electronic device is being studied such that a size of the electronic device is transformable according to a use state. With enhancement in performance of the electronic device, research on improvement of a heat dissipation function to lower an internal temperature is ongoing.

The above information is presented as background information only to assist with an understanding of the disclosure. No determination has been made, and no assertion is made, as to whether any of the above might be applicable as prior art with regard to the disclosure.

SUMMARY

An electronic device may dissipate heat to an outside through a display. Since a foldable electronic device has a decreased exposed surface of a display in a folded state, an internal temperature may increase compared to that in an unfolded state. In the case of the foldable electronic device, an internal part of the electronic device may be separately provided based on a folding axis to be folded in response to a folding motion. Therefore, a degree of heat generation may differ in each area of the electronic device.

Aspects of the disclosure are to address at least the above-mentioned problems and/or disadvantages and to provide at least the advantages described below. Accordingly, an aspect of the disclosure is to provide an electronic device including a heat transfer member for evenly dissipating heat generated in the electronic device to the entire area.

Another aspect of the disclosure is to perform an efficient heat transfer between the respective areas of an electronic device divided based on a folding axis.

Another aspect of the disclosure is to perform a heat dissipation function of an electronic device through a display.

Additional aspects will be set forth in part in the description which follows and, in part, will be apparent from the description, or may be learned by practice of the presented embodiments.

In accordance with an aspect of the disclosure, an electronic device is provided. The electronic device includes a display including a first area and a second area, a first housing configured to support the first area and to form a first space, a second housing configured to support the second area and to form a second space, a hinge structure configured to foldably connect the first housing and the second housing based on a folding axis to be in a first state in which the first area and the second area form substantially a same plane or in a second state in which the first area and the second area face each other, and a heat transfer member provided to extend from the first space to the second space through the hinge structure and configured to perform a heat transfer between the first space and the second space. The heat transfer member may include a first heat transfer area provided in the first space, a second heat transfer area provided in the second space, a connecting area configured to connect the first heat transfer area and the second heat transfer area and provided to the hinge structure, a heat transfer space internally formed and connected from the first heat transfer area to the second heat transfer area through the connecting area, and a cover configured to surround the heat transfer space and to form an appearance.

In accordance with another aspect of the disclosure, an electronic device is provided. The electronic device includes a display including a first area and a second area foldable through a folding axis, a first support plate positioned in a rear direction of the first area, a second support plate positioned in a rear direction of the second area, a hinge housing to which a hinge for rotating the first support plate and the second support plate based on the folding axis is fastened, provided along the folding axis, and configured to connect the first support plate and the second support plate, a first printed circuit board (PCB) provided to face the first area based on the first support plate, a second PCB provided to face the second area based on the second support plate, and a heat transfer member including a first heat transfer area provided on a rear surface of the first area, a second heat transfer area provided on the rear surface of the second area, a connecting area configured to connect the first heat transfer area and the second heat transfer area across the hinge housing, a heat transfer space internally formed for connection with the first heat transfer area and the second heat transfer area through the connecting area, a cover configured to seal the heat transfer space, and a first heat transfer area and a second heat transfer area of the cover may include a metallic material and the connecting area includes a flexible material.

In accordance with another aspect of the disclosure, a heat transfer member provided in an electronic device is provided. The heat transfer member includes a plurality of heat transfer areas spaced apart from each other, at least one connecting area configured to foldably connect a single pair of the heat transfer areas that are adjacent to each other, a heat transfer space internally formed for mutual connection between the plurality of heat transfer areas and the at least one connecting area, a heat transfer fluid accommodated in the heat transfer space and configured to undergo a phase change according to a temperature, and a wick structure provided along the inner surface of the heat transfer area and configured to move the heat transfer fluid in a liquid state. The heat transfer area may include a metallic material, and the at least one connecting area may include a bendable flexible material.

According to various example embodiments, it is possible to implement an effective heat transfer function between both areas (e.g., a first housing and a second housing) of an electronic device through a heat transfer member provided across a folding axis.

According to various example embodiments, it is possible to implement a primary heat dissipation function through a heat transfer member and a secondary heat dissipation function through a heat transfer fluid accommodated in a heat conduction element.

According to various example embodiments, by forming a connecting area of a heat transfer member provided to a hinge of an electronic device to be bendable, a shape of the heat transfer member may be transformed in response to a folding motion of the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
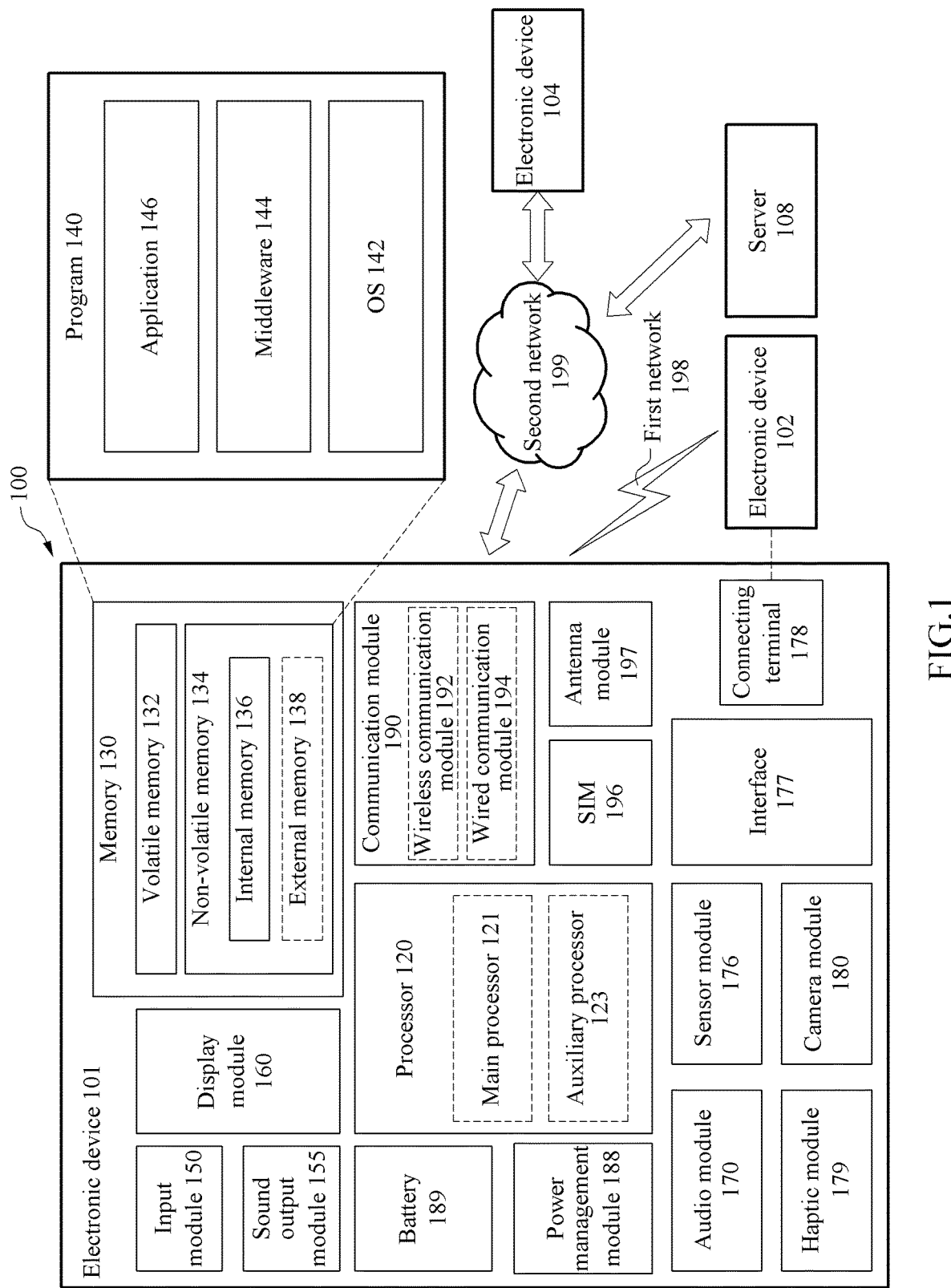
FIG. 1 is a block diagram illustrating an example electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or communicate with an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include any one or any combination of a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, and an antenna module 197. In some example embodiments, at least one (e.g., the connecting terminal 178) of the above components may be omitted from the electronic device 101, or one or more other components may be added in the electronic device 101. In some example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another components (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101 (e.g., a user). The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a fourth generation (4G) network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include a slit antenna, and/or an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102 and 104, and the server 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that various example embodiments of the disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 2A:
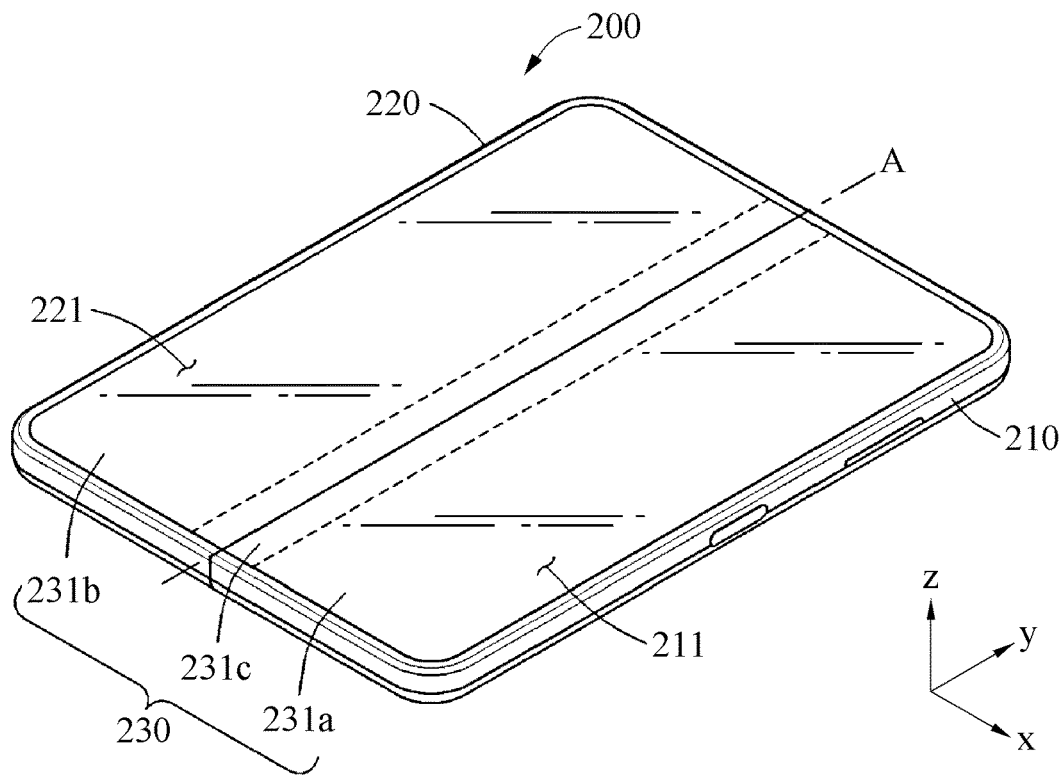
FIGS. 2A and 2B illustrate a use state of an electronic device according to various embodiments of the disclosure.
Figure 2B:
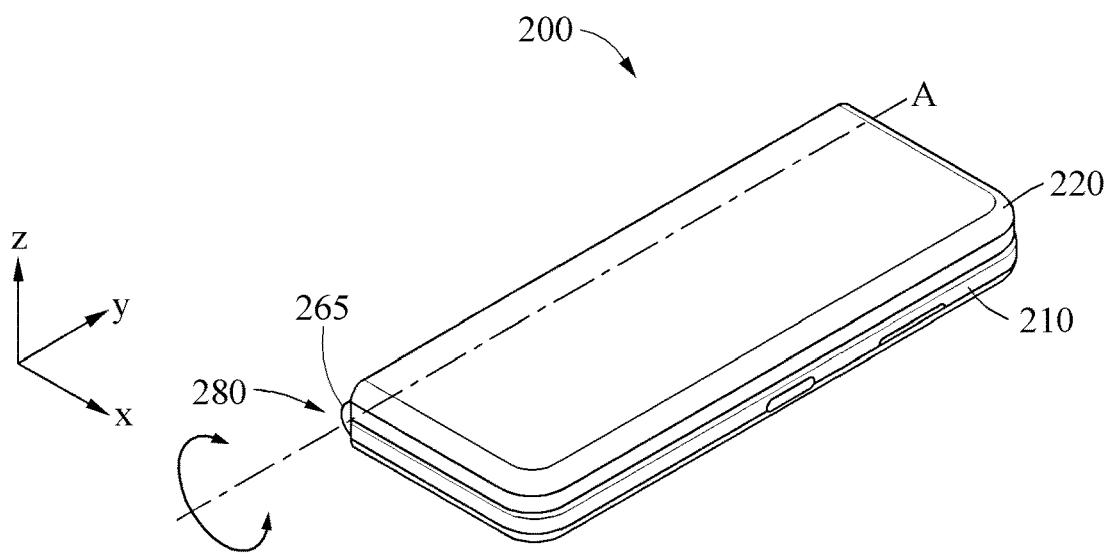

FIGS. 2A and 2B illustrate a use state of an electronic device according to various embodiments of the disclosure.

Referring to FIGS. 2A and 2B, a shape of an electronic device 200 (e.g., the electronic device 101 of FIG. 1) according to various example embodiments may be transformed according to a use state. For example, the electronic device 200 may be provided as a foldable type that may be folded or unfolded according to a use state. In an example embodiment, the electronic device 200 may include a display 230, a first housing 210, a second housing 220, a hinge cover 265 configured to cover a foldable portion of the first housing 210 and the second housing 220, and a hinge structure 280.

The display 230 may display visual information for a user. In an example embodiment, at least a partial area of the display 230 may be transformed into a flat surface or a curved surface such that a shape of the display 230 may be transformed according to a shape transformation (e.g., an opening and closing motion of the electronic device 200 between an open state (or an unfolded state) of FIG. 2A and a closed state (or a folded state) of FIG. 2B) of the electronic device 200. In an example embodiment, the display 230 may include a folding area 231c in which a folding axis (A) is positioned, a first area 231a that is provided on one side (e.g., a right area of the folding area 231c of FIG. 2A) of the folding area 231c, and a second area 231b that is provided on another side (e.g., a left area of the folding area 231c of FIG. 2A) of the folding area 231c. In an example embodiment, the overall shape of the display 230 may be transformed in response to an opening and closing motion of the electronic device 200 in such a manner that a relative angle formed by the first area 231a and the second area 231b is adjusted through the folding area 231c. For example, a shape of the display 230 may be transformed to be in a first state (e.g., a full open state of FIG. 2A) in which the first area 231a and the second area 231b form substantially the same plane, an intermediate state in which the first area 231a and the second area 231b form a predetermined angle, or a second state (e.g., a folded state of FIG. 2B) in which the first area 231a and the second area 231b face each other.

In an example embodiment, the first area 231a and the second area 231b may have an overall symmetrical shape based on the folding area 231c. Here, due to another configuration exposed on the front surface of the electronic device 200, the first area 231a or the second area 231b may include a partially cut notch area and may include a partially asymmetrical shape accordingly. Here, area division of the display 230 is provided as an example only and the display 230 may be divided into a plurality of areas according to functions and structures required for the electronic device 200. For example, although the display 230 is divided into areas based on the folding axis (A) parallel to the y-axis or the folding area 231c in FIG. 2A, the display 230 may be divided into areas based on another folding axis (A) (e.g., the folding axis (A) parallel to the x-axis or another folding area 231c) in another example embodiment.

The first housing 210 and the second housing 220 may form an appearance of the electronic device 200. In an example embodiment, the first housing 210 and the second housing 220 may form the rear surface of the electronic device 200 through connection with the hinge structure 280. Each of the first housing 210 and the second housing 220 may include the front surface and the rear surface of the electronic device 200, and the side surface that partially covers a space between the front surface and the rear surface. In this case, the overall front surface of the electronic device 200 may be formed to be open such that the display 230 may be visually exposed to the outside. Hereinafter, for convenience of description, the surface on which the display 230 is exposed to the outside may be referred to as the front surface of the electronic device 200, the surface opposite to the front surface may be referred to as the rear surface of the electronic device 200, and the surface that surrounds the space between the front surface and the rear surface may be referred to as the side surface of the electronic device 200.

In an example embodiment, the first housing 210 and the second housing 220 may be respectively connected to the rear surface of the display 230 and may support the first area 231a and the second area 231b of the display 230, respectively. For example, the first housing 210 may be connected to support the rear surface of the first area 231a and may form a first space 211 positioned on the rear surface of the first area 231a, and the second housing 220 may be connected to support the rear surface of the second area 231b and may form a second space 221 positioned on the rear surface of the second area 231b. In an example embodiment, the first space 211 and the second space 221 may form a single space in which the display 230 is safely received through coupling of the first housing 210 and the second housing 220.

The hinge structure 280 may foldably connect the first housing 210 and the second housing 220. In an example embodiment, the first housing 210 and the second housing 220 may relatively rotate based on the folding axis (A) by way of the hinge structure 280. In this case, an angle formed between the first housing 210 and the second housing 220 may be adjusted according to a motion of using the electronic device 200. In an example embodiment, since the display 230 is supported by the first housing 210 and the second housing 220, an angle between the first area 231a and the second area 231b of the display 230 in response to a folding and unfolding motion of the first housing 210 and the second housing 220).

In an example embodiment, the first housing 210 and the second housing 220 may form an angle at substantially 180 degrees through the hinge structure 280 in the first state (e.g., the full open state of FIG. 2A) of the electronic device 200. In this case, the first area 231a and the second area 231b of the display 230 may be provided to face the same direction (e.g., z-axis) and may form substantially the same plane. On the other hand, in the second state (e.g., the closed state of FIG. 2B) of the electronic device 200, the first housing 210 and the second housing 220 may be provided to substantially face each other through the hinge structure 280. In this case, the first area 231a and the second area 231b of the display 230 may form a narrow angle (e.g., in the range of 0 to 10 degrees) based on the folding axis (A) and face each other, and may not be visually exposed to the outside. In the second state, the folding area 231c of the display 230 may form the curved surface with a predetermined curvature. In an example embodiment, when the electronic device 200 is in the intermediate state, the first housing 210 and the second housing 220 may be provided to form a predetermined angle therebetween through the hinge structure 280. In this case, the first area 231a and the second area 231b of the display 230 may form an angle less than the first state and greater than the second state based on the folding axis (A). In the intermediate state, the folding area 231c may form the curved surface with a smaller curvature than that in the second state.

Figure 3A:
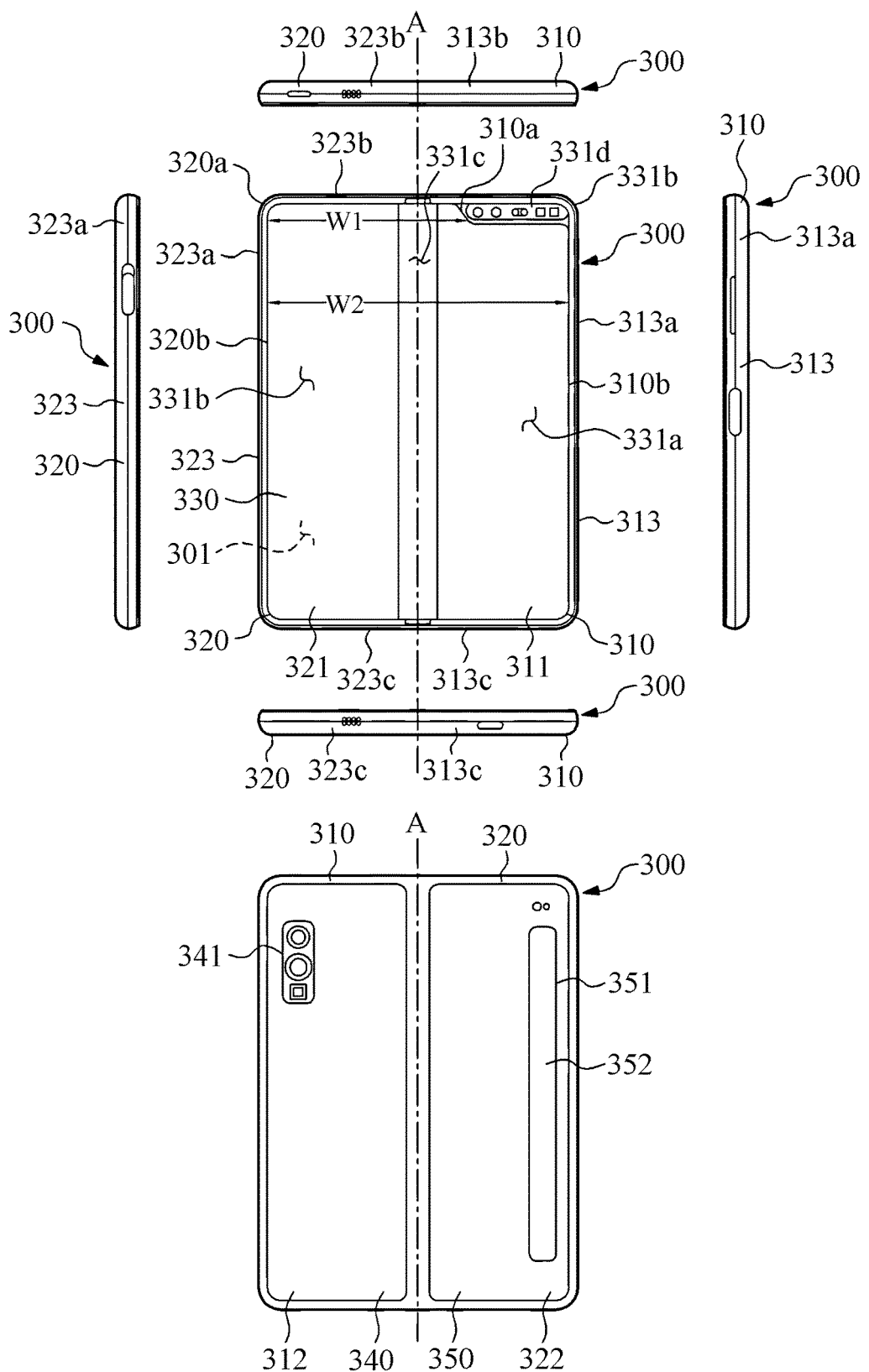
FIG. 3A illustrates an unfolded state of an electronic device according to an embodiment of the disclosure.

FIG. 3A illustrates an unfolded state of an electronic device according to an embodiment of the disclosure.

Figure 3B:
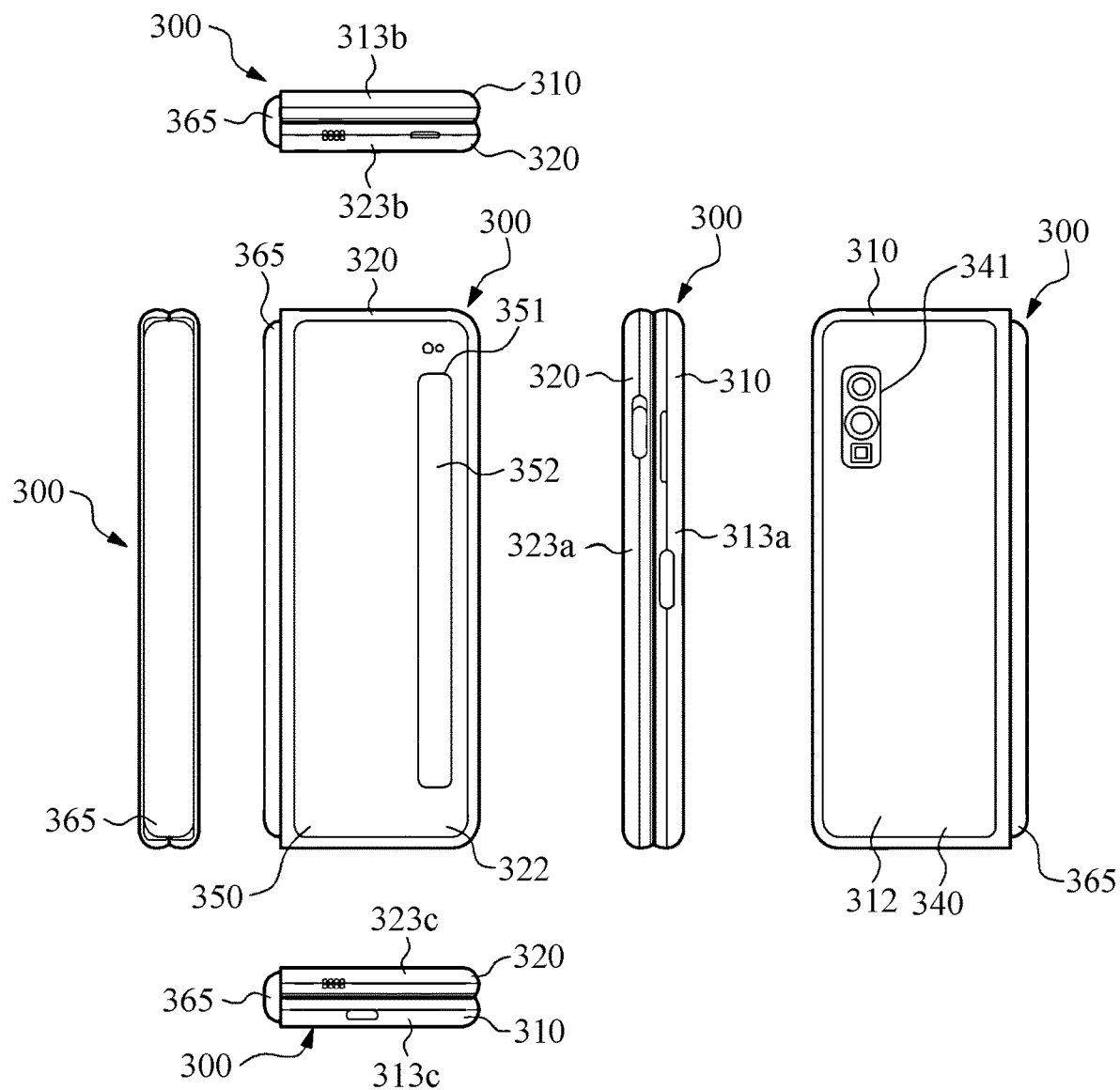
FIG. 3B illustrates a folded state of an electronic device according to an embodiment of the disclosure.

FIG. 3B illustrates a folded state of an electronic device according to an embodiment of the disclosure.

Figure 3C:
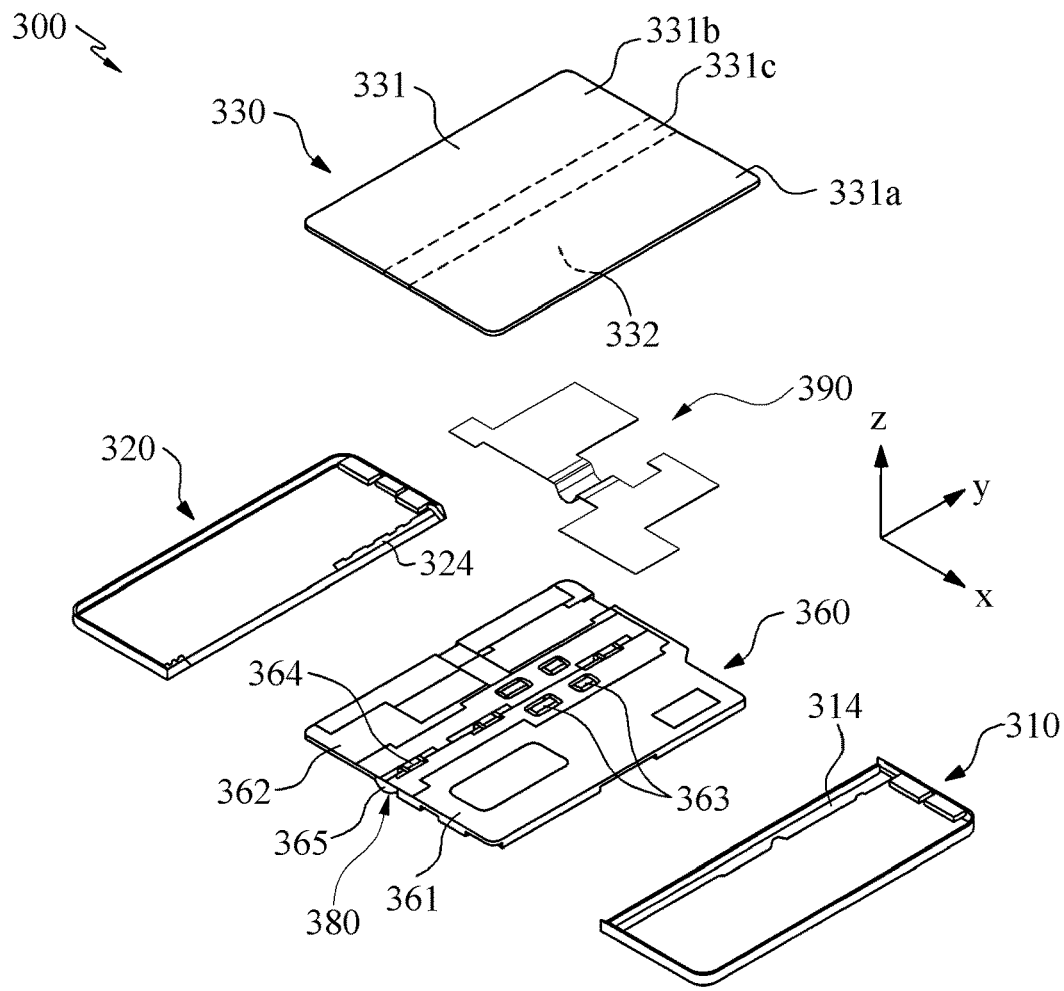
FIG. 3C is an exploded perspective view of an electronic device according to an embodiment of the disclosure.

FIG. 3C is an exploded perspective view of the electronic device according to an embodiment of the disclosure.

Referring to FIGS. 3A, 3B, and 3C, the electronic device 300 (e.g., the electronic device 101 of FIG. 1 and the electronic device 200 of FIG. 2A) according to various example embodiments may include a single pair of housings 310 and 320 configured to rotatably couple through a hinge structure to be folded against each other, a hinge cover 365 configured to cover a foldable portion of the single pair of housings 310 and 320, a display 330 (e.g., a flexible display or a foldable display) provided in a space formed by the single pair of housings 310 and 320, a hinge assembly 360, a substrate 370, and a heat transfer member 390.

In an example embodiment, the electronic device 300 may include the first housing 310 including a sensor area 331d, the second housing 320, a first rear cover 340, and a second rear cover 350. Meanwhile, the single pair of housings 310 and 320 of the electronic device 300 are not limited to combination and/or coupling of shapes or parts of FIGS. 3A and 3B and may be implemented by combination and/or coupling of other shapes or parts.

In an example embodiment, the first housing 310 and the second housing 320 may be provided on both sides based on a folding axis (A) and may be substantially symmetrically provided relative to the folding axis (A). In an example embodiment, an angle or a distance formed by the first housing 310 and the second housing 320 may differ depending on whether the electronic device 300 is in an unfolded state, in a folded state, or in an intermediate state. In an example embodiment, dissimilar to the second housing 320, the first housing 310 may include the sensor area 331d in which various sensor modules (e.g., the sensor module 176 of FIG. 1) are provided and, in other areas, the first housing 310 and the second housing 320 may have a mutually symmetrical shape. In another example embodiment, the sensor area 331d may be replaced with at least a partial area of the second housing 320. For example, the sensor area 331d may include a camera hole area, a sensor hole area, an under display camera (UDC) area, and/or an under display sensor (UDS) area.

In an example embodiment, the first housing 310 may be connected to the hinge structure in an unfolded state of the electronic device 300. The first housing 310 may include a first surface 311 provided to face the front surface of the electronic device 300, a second surface 312 provided to face the first surface 311, and a first side portion 313 configured to surround at least a portion of a space between the first surface 311 and the second surface 312. The first side portion 313 may include a first side surface 313a provided substantially parallel to the folding axis (A), a second side surface 313b configured to extend from one end of the first side surface 313a in a direction substantially perpendicular to the folding axis (A), and a third side surface 313c configured to extend from another end of the first side surface 313a in a direction substantially perpendicular to the folding axis (A) and substantially parallel to the second side surface 313b. The second housing 320 may be connected to the hinge structure in an unfolded state of the electronic device 300. The second housing 320 may include a third surface 321 provided to face the front surface of the electronic device 300, a fourth surface 322 configured to face the third surface 321, and a second side portion 323 configured to surround at least a portion of a space between the third surface 321 and the fourth surface 322. The second side portion 323 may include a fourth side surface 323a provided substantially parallel to the folding axis (A), a fifth side surface 323b configured to extend from one end of the fourth side surface 323a in a direction substantially perpendicular to the folding axis (A), and a sixth side surface 323c configured to extend from another end of the fourth side surface 323a in a direction substantially perpendicular to the folding axis (A) and substantially parallel to the fifth side surface 323b. The first surface 311 and the third surface 321 may face each other when the electronic device 300 is in the folded state.

In an example embodiment, the electronic device 300 may include a recess-shaped accommodating portion 301 configured to accommodate the display 330 through structural coupling of the first housing 310 and the second housing 320. The accommodating portion 301 may have substantially the same size as that of the display 330. In an example embodiment, due to the sensor area 331d, the accommodating portion 301 may have different two widths in a direction perpendicular to the folding axis (A). For example, the accommodating portion 301 may have a first width (W1) between the first portion 310a formed at an edge of the sensor area 331d of the first housing 310 and the second portion 320a parallel to the folding axis (A) of the second housing 320 and a second width (W2) between a third portion 310b parallel to the folding axis (A) without overlapping the sensor area 331d of the first housing 310 and a fourth portion 320b of the second housing 320. Here, the second width (W2) may be greater than the first width (W1).

That is, the accommodating portion 301 may be formed to have the first width (W1) from the first portion 310a of the first housing 310 to the second portion 320a of the second housing 320, the first portion 310a and the second portion 320a being an asymmetrical shape, and the second width (W2) from the third portion 310b of the first housing 310 to the fourth portion 320b of the second housing 320. The first portion 310a and the third portion 310b of the first housing 310 may be formed to have different distances from the folding axis (A). Meanwhile, a width of the accommodating portion 301 illustrated in the drawings is not limited thereto. For example, the accommodating portion 301 may have at least three different widths due to a shape of the sensor area 331d or the asymmetrical shape between the first housing 310 and the second housing 320.

In an example embodiment, at least a portion of the first housing 310 and the second housing 320 may be formed of a metallic material or a non-metallic material having a rigidity suitable for supporting the display 330.

In an example embodiment, the sensor area 331d may be formed adjacent to one corner of the first housing 310. Here, an arrangement, a shape, or a size of the sensor area 331d is not limited to the illustrated example. In another example embodiment, the sensor area 331d may be formed in another corner or a predetermined area of an upper corner and a lower corner of the first housing 310. In some example embodiments, the sensor area 331d may be formed to extend between the first housing 310 and the second housing 320.

In an example embodiment, the electronic device 300 may include at least one component configured to perform various functions exposed on the front surface of the electronic device 300 through the sensor area 331d or through at least one opening formed in the sensor area 331d. For example, the component may include at least one of a front camera module, a receiver, a proximity sensor, an illumination sensor, an iris recognition sensor, an ultrasonic sensor, and an indicator.

In an example embodiment, the first rear cover 340 may be provided on the second surface 312 of the first housing 310 and may have substantially rectangular edges. At least a portion of the edges of the first rear cover 340 may be surrounded by the first housing 310. The second rear cover 350 may be provided on the fourth surface 322 of the second housing 320 and may have substantially rectangular edges. At least a portion of the edges of the second rear cover 350 may be surrounded by the second housing 320.

In an example embodiment, the first rear cover 340 and the second rear cover 350 may have a substantially symmetrical shape based on the folding axis (A). In another example embodiment, the first rear cover 340 and the second rear cover 350 may have different shapes. In still another example embodiment, the first housing 310 and the first rear cover 340 may be integrally formed, and the second housing 320 and the second rear cover 350 may be integrally formed.

In an example embodiment, the first housing 310, the second housing 320, the first rear cover 340, and the second rear cover 350 may provide a space in which various components (e.g., a printed circuit board (PCB), the antenna module 197 of FIG. 1, the sensor module 176 of FIG. 1, or the battery 189 of FIG. 1) of the electronic device 300 through a mutually coupled structure. In an example embodiment, at least one component may be visually exposed on the rear surface of the electronic device 300. For example, at least one component may be visually exposed through a first rear area 341 of the first rear cover 340. Here, the component may include a proximity sensor, a rear camera module, and/or a flash. In an example embodiment, at least a portion of a sub-display 352 may be visually exposed through a second rear area 351 of the second rear cover 350. In an example embodiment, the electronic device 300 may include a sound output module (e.g., the sound output module 155 of FIG. 1) provided through at least a partial area of the second rear cover 350.

In an example embodiment, the display 330 may be provided to the accommodating portion 301 formed by the single pair of housings 310 and 320. For example, the display 330 may be provided to occupy substantially most of the front surface of the electronic device 300. The front surface of the electronic device 300 may include an area in which the display 330 is provided, a partial area (e.g., an edge area) of the first housing 310 adjacent to the display 330, and a partial area (e.g., an edge area) of the second housing 320. The rear surface of the electronic device 300 may include the first rear cover 340, a partial area (e.g., edge area) of the first housing 310 adjacent to the first rear cover 340, the second rear cover 350, and a partial area (e.g., edge area) of the second housing 320 adjacent to the second rear cover 350. In an example embodiment, at least a partial area of the display 330 may be transformed into a flat surface or a curved surface. In an example embodiment, the display 330 may include a folding area 331*c*, a first area 331*a* positioned on a first side (e.g., right) based on the folding area 331*c*, and a second area 331*b* positioned on a second side (e.g., left) based on the folding area 331*c*. The first area 331*a* may be positioned on the first surface 311 of the first housing 310, and the second area 331*b* may be positioned on the third surface 321 of the second housing 320. Here, the above area division of the display 330 is provided as an example only. The display 330 may be divided into a plurality of areas according to a structure or a function of the display 330. The area division of the display 330 is simply a physical division by the single pair of housings 310 and 320 and the hinge structure. The display 330 may be practically a single screen through the single pair of housings 310 and 320 and the hinge structure. In an example embodiment, the first area 331*a* may include a notch area formed along the sensor area 331*d*, and, in other areas, may have a substantially symmetrical shape with the second area 331*b*. In another example embodiment, since the sensor area 331*d* is not exposed on the first area 331*a* or the second area 331*b*, the first area 331*a* and the second area 331*b* may have a substantially symmetrical shape based on the folding axis (A).

In an example embodiment, the hinge cover 365 may be provided between the first housing 310 and the second housing 320 and may be configured to cover the hinge structure. The hinge cover 365 may be hidden or exposed to the outside by at least a portion of the first housing 310 and the second housing 320 according to an operating state of the electronic device 300. For example, referring to FIG. 3A, when the electronic device 300 is in an unfolded state, the hinge cover 365 may be hidden by the first housing 310 and the second housing 320 and may not be exposed to the outside accordingly. Referring to FIG. 3B, when the electronic device 300 is in a folded state, the hinge cover 365 may be exposed to the outside between the first housing 310 and the second housing 320. Meanwhile, when the electronic device 300 is in an intermediate state that forms an angle between the unfolded state of FIG. 3A and the folded state of FIG. 3B, at least a portion of the hinge cover 365 may be exposed to the outside between the first housing 310 and the second housing 320. In this case, an area in which the hinge cover 365 is exposed to the outside may be less than an exposed area of the hinge cover 365 in the folded state of the electronic device 300. In an example embodiment, the hinge cover 365 may have a curved shape.

In an example embodiment, when the electronic device 300 is in an unfolded state (e.g., the unfolded state of 3A), the first housing 310 and the second housing 320 may form a first angle (e.g., about 180 degrees), and the first area 331*a* and the second area 331*b* of the display 330 may be oriented in substantially the same direction. The folding area 331*c* of the display 330 may be substantially coplanar with the first area 331*a* and the second area 331*b*. In another example embodiment, when the electronic device 300 is in an unfolded state, the first housing 310 may rotate at a second angle (e.g., about 360 degrees) relative to the second housing 320 and may be reversely folded such that the second surface 312 and the fourth surface 322 may face each other. Here, when the electronic device 300 is in a folded state (e.g., the folded state of FIG. 3B), the first housing 310 and the second housing 320 may face each other. The first housing 310 and the second housing 320 may form an angle of about zero to 10 degrees and the first area 331*a* and the second area 331*b* of the display 330 may face each other. In this case, at least a portion of the folding area 331*c* of the display 330 may be transformed into a curved surface. In an example embodiment, when the electronic device 300 is in an intermediate state, the first housing 310 and the second housing 320 may form a specific angle therebetween. In this case, the angle (e.g., a third angle, about 90 degrees) formed by the first area 331*a* and the second area 331*b* of the display 330 is greater than the angle when the electronic device 300 is in the folded state and less than the angle when the electronic device 300 is in the unfolded state. In this case, the folding area 331*c* may be transformed to have a curvature less than a curvature of the curved surface when the electronic device 300 is in the folded state.

In an example embodiment, the display 330 may include a display panel 331 (e.g., a flexible display panel) and at least one plate 332 or layer disposed on the rear surface of the display panel 331.

In an example embodiment, the display panel 331 may include a display substrate having flexibility, a plurality of display elements coupled to the display substrate to form a plurality of pixels, at least one conductive line coupled to the display substrate and electrically connected to other display elements, and a thin film encapsulated layer configured to prevent inflow of oxygen and moisture from the outside. In an example embodiment, a touch panel may be provided to or integrally formed with the display panel 331.

The display substrate may be formed of a flexible material, for example, a plastic material such as polyimide (PI). However, a material of the display substrate is not limited thereto and may include various materials having a flexible property. The plurality of display elements may be disposed on the display substrate and may form a plurality of pixels. For example, the plurality of display elements may be arranged in a matrix form on the display substrate and may form pixels of the display panel 331. In this case, the plurality of display elements may include a fluorescent material or an organic fluorescent material. For example, the display elements may include organic light emitting diode (OLED). The conductive line may include at least one gate signal line or at least one data signal line. For example, the conductive line may include a plurality of gate signal lines and a plurality of data signal lines, and the plurality of gate signal lines and the plurality of data signal lines may be arranged in a matrix form. In this case, the plurality of display elements may be provided adjacent at which the plurality of lines intersects and may be electrically connected to the respective lines. The thin film encapsulated layer may prevent inflow of oxygen and moisture from the outside by covering the display substrate, the plurality of display elements, and the conductive line. In an example embodiment, the thin film encapsulated layer may be stacked such that at least one organic layer and at least one inorganic layer alternate with each other.

In an example embodiment, the touch panel may be integrally formed with or attached to the display panel 331. For example, the touch panel may be formed in such a manner that an aluminum metal mesh sensor is patterned on the thin film encapsulated layer of the display panel 331.

In an example embodiment, a polarizing film may be stacked between the display panel 331 and the touch panel. The polarizing film may improve visibility of the display 330. The polarizing film may change a phase of light that passes through the display 330. For example, the polarizing film may prevent light incident to the display panel 331 from being reflected by converting linearly polarized light to circularly polarized light or by changing the circularly polarized light to the linearly polarized light.

A window layer may be formed using a transparent plastic film having high flexibility and high hardness. For example, the window layer may be formed using a PI film or a polyethylene terephthalate (PET) film. In an example embodiment, the window layer may be formed as a multilayer that includes a plurality of plastic films.

In an example embodiment, the plate 332 may support the rear surface of the display panel 331, thereby improving an impact resistance of the display panel 331. In an example embodiment, the plate 332 may be divided to support the rear surface of each of the first area 331a and the second area 331b of the display panel 331. In this case, each area of the plate 332 may be dividedly attached to the rear surface of the first area 331a and the second area 331b of the display 330 to not contact each other along the folding axis (A). According to the above structure, the plate 332 may not interfere with a folding motion of the display 330 that is performed along the folding axis (A).

In an example embodiment, the plate 332 may be formed of a conductive material, for example, copper or an alloy material containing copper. In this case, the plate 332 may improve an impact resistance of the display 330 and, at the same time, may serve as a heat transfer path of transferring heat generated in an internal part (e.g., an application processor (AP)) of the electronic device 300 to the display panel 331.

The hinge assembly 360 may include a first support plate 361, a second support plate 362, a hinge structure 380 provided between the first support plate 361 and the second support plate 362, the hinge cover 365 configured to cover the hinge structure 380 when viewed from the outside, and a wiring member 363 (e.g., a flexible printed circuit board (FPCB)) configured to cross the first support plate 361 and the second support plate 362.

In an example embodiment, the first support plate 361 may be positioned in a rear direction of the first area 331a of the display 330, and the second support plate 362 may be positioned in a rear direction of the second area 331b of the display 330.

In an example embodiment, the wiring member 363 and at least a portion 364 of the hinge structure may be provided in the hinge assembly 360. The wiring member 363 may be provided in a direction (e.g., an x-axis direction) that crosses the first support plate 361 and the second support plate 362. The wiring member 363 may be provided in a direction perpendicular to the folding axis (A) of the electronic device 300.

The substrate 370 may include a first PCB 371 that is provided to the first support plate 361 and a second PCB 372 that is provided to the second support plate 362. The first PCB 371 and the second PCB 372 may be provided in a space formed by the hinge assembly 360, the first housing 310, the second housing 320, the first rear cover 340, and the second rear cover 350. Electronic parts for implementing various functions of the electronic device 300 may be mounted to the first PCB 371 and the second PCB 372. In an example embodiment, the first PCB 371 may be provided to face the first area 331a based on the first support plate 361, and the second PCB 372 may be provided to face the second area 331b based on the second support plate 362.

The first housing 310 and the second housing 320 may be assembled to both sides of the hinge assembly 360 in a state in which the display 330 is coupled to the hinge assembly 360. For example, the first housing 310 and the second housing 320 may be coupled to the hinge assembly 360 by sliding from both sides of the hinge assembly 360. In an example embodiment, the first housing 310 may include a first rotational support surface 314, and the second housing 320 may include a second rotational support surface 324 corresponding to the first rotational support surface 314. The first rotational support surface 314 and the second rotational support surface 324 may include a curved surface corresponding to a curved surface included in the hinge cover 365.

In an example embodiment, when the electronic device 300 is in an unfolded state (e.g., the unfolded state of FIG. 3A), the first rotational support surface 314 and the second rotational support surface 324 may cover the hinge cover 365 such that the hinge cover 365 may not be exposed on the rear surface of the electronic device 300 or may have a minimum exposed area. On the contrary, when the electronic device 300 is in a folded state (e.g., the folded state of FIG. 3B), the first rotational support surface 314 and the second rotational support surface 324 may rotate along the curved surface included in the hinge cover 365 such that the hinge cover 365 may have a maximum exposed area on the rear surface of the electronic device 300.

In an example embodiment, the heat transfer member 390 may be provided in an internal space of the electronic device 300 and may perform a heat dissipation function in the internal space of the electronic device 300. For example, the heat transfer member 390 may be provided to cross the first housing 310 and the second housing 320 and may perform a heat transfer between a first space formed by the first housing 310 and a second space formed by the second housing 320. In an example embodiment, the heat transfer member 390 may be positioned between the display 330 and the hinge assembly 360.

Figure 4A:
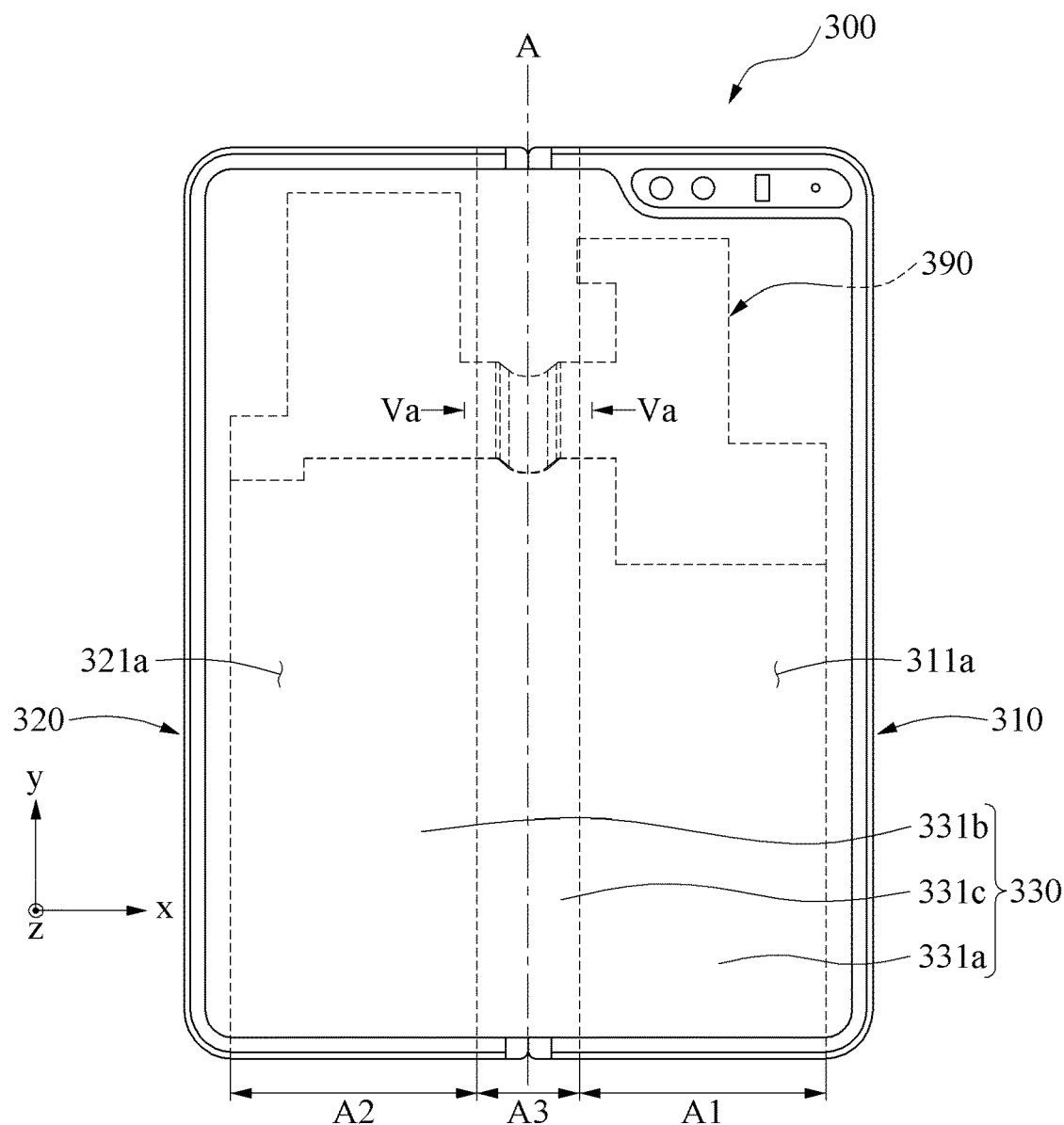
FIG. 4A illustrates an arrangement state of a heat transfer member in an unfolded state of an electronic device according to an embodiment of the disclosure.
Figure 4A:
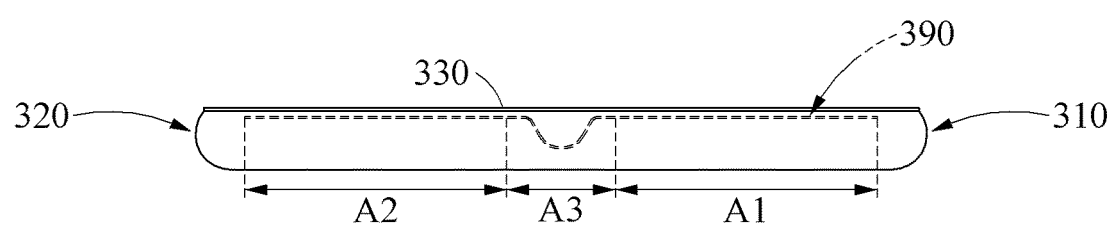

FIG. 4A illustrates an arrangement state of a heat transfer member in an unfolded state of an electronic device according to an embodiment of the disclosure.

Figure 4B:
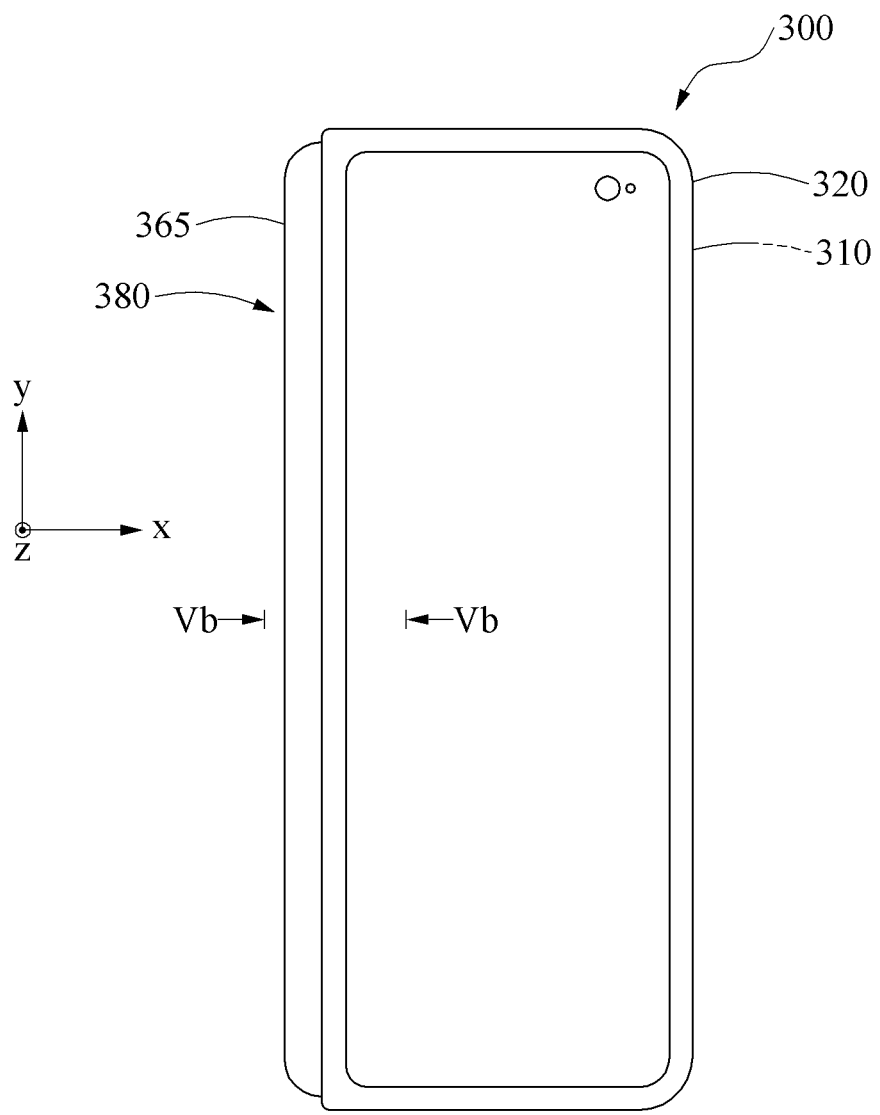
FIG. 4B illustrates an arrangement state of a heat transfer member in a folded state of an electronic device according to an embodiment of the disclosure.
Figure 4B:
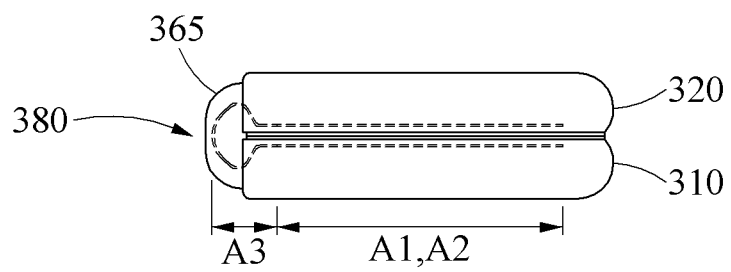

FIG. 4B illustrates an arrangement state of a heat transfer member in a folded state of an electronic device according to an embodiment of the disclosure.

Referring to FIGS. 4A and 4B, the heat transfer member 390 may be provided in the electronic device 300 and a shape of the heat transfer member 390 may be transformed in response to a folding motion of the electronic device 300. In an example embodiment, the heat transfer member 390 may be provided to extend from a first space 311a formed by the first housing 310 into a second space 321a formed by the second housing 320 through the hinge structure. In an example embodiment, the heat transfer member 390 may include a first heat transfer area (A1) provided in the first space 311a, a second heat transfer area (A2) provided in the second space 321a, and a connecting area (A3) configured to connect the first heat transfer area (A1) and the second heat transfer area (A2) and provided in the hinge structure. In this case, the first heat transfer area (A1) may be disposed on the rear surface of the first area 331a of the display 330, the second heat transfer area (A2) may be disposed on the rear surface of the second area 331b of the display 330, and the connecting area (A3) may be disposed on the rear surface of the folding area 331c of the display 330 to cross the first area 331a and the second area 331b of the display 330.

In an example embodiment, a shape of the heat transfer member 390 may be transformed in response to a motion of the electronic device 300. For example, the connecting area (A3) of the heat transfer member 390 may be formed to be bendable in response to a folding motion of the first housing 310 and the second housing 320 and may be folded or unfolded based on the folding axis (A) accordingly. Therefore, the overall shape of the heat transfer member 390 may be transformed in response to the folding motion of the electronic device 300. For example, when the electronic device 300 is in an unfolded state (e.g., an unfolded state of FIG. 4A), the heat transfer member 390 may be unfolded such that the first heat transfer area (A1) and the second heat transfer area (A2) may be oriented in the same direction (e.g., front surface (z direction)). On the contrary, when the electronic device 300 is in a folded state (e.g., a folded state of FIG. 4B), the connecting area (A3) of the heat transfer member 390 may be folded such that the first heat transfer area (A1) and the second heat transfer area (A2) may face each other.

In an example embodiment, the heat transfer member 390 may perform a heat transfer between the first space 311a and the second space 321a of the electronic device 300. The first space 311a and the second space 321a of the electronic device 300 are separated based on the folding axis (A). Parts serving as main heat source of the electronic device 300, for example, an application processor (AP), a graphic processing unit (GPU), and/or a power management IC (PMIC) may be provided in each space. Therefore, the electronic device 300 may have a different temperature between the first space 311a and the second space 321a. In an example embodiment, the heat transfer member 390 is provided to cross the first space 311a and the second space 321a and may serve to dissipate heat between the first space 311a and the second space 321a. For example, with the assumption that a temperature of the first space 311a is higher than a temperature of the second space 321a, the heat transfer member 390 may absorb heat of the first space 311a in the first heat transfer area (A1), may transfer the absorbed heat to the second heat transfer area (A2), and may dissipate the heat to the second space 321a through the second heat transfer area (A2).

Figure 5A:
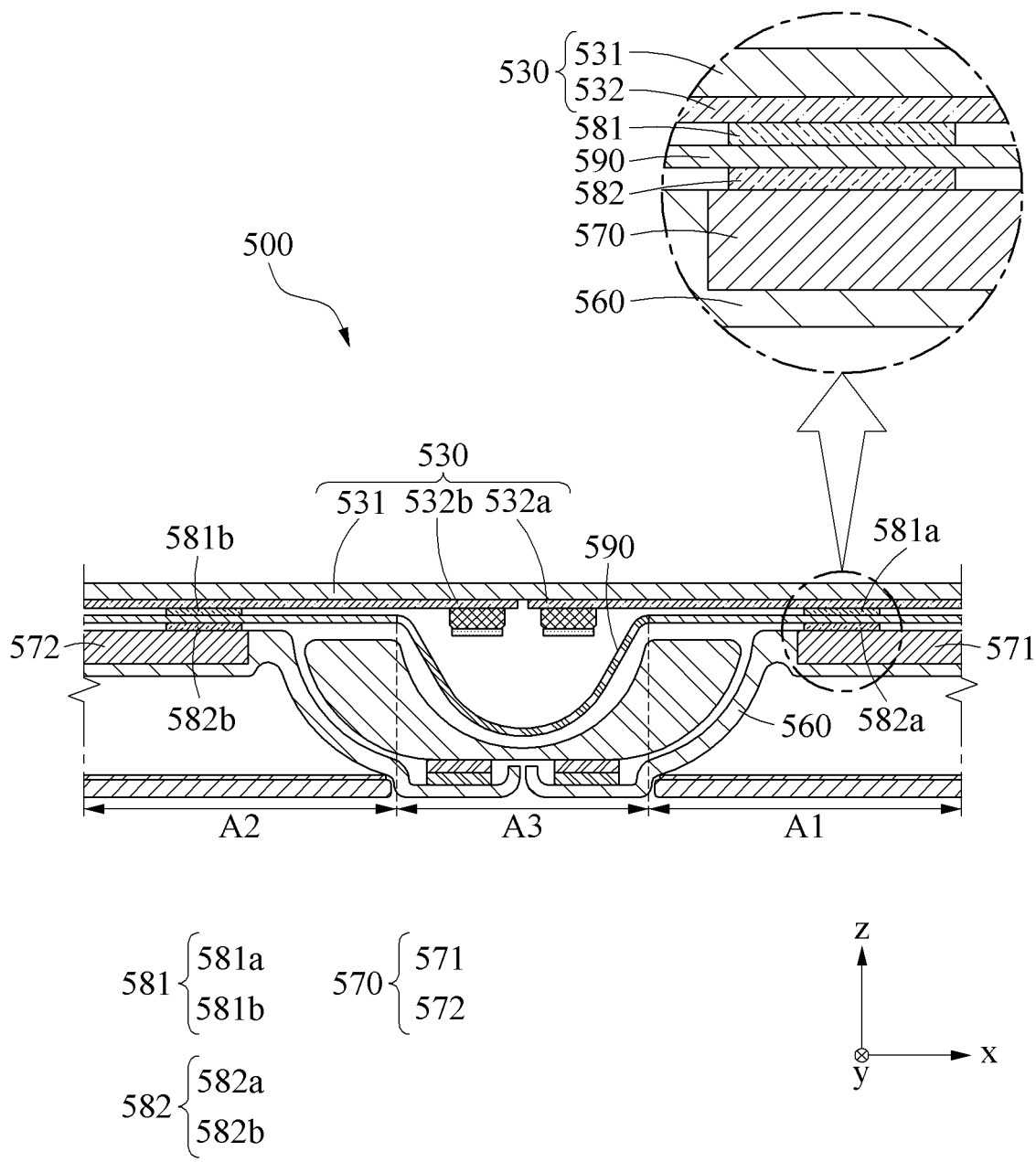
FIG. 5A is a cross-sectional view of an electronic device cut along a line Va-Va of FIG. 4A according to an embodiment of the disclosure.

FIG. 5A is a cross-sectional view of an electronic device cut along a line Va-Va of FIG. 4A according to an embodiment of the disclosure.

Figure 5B:
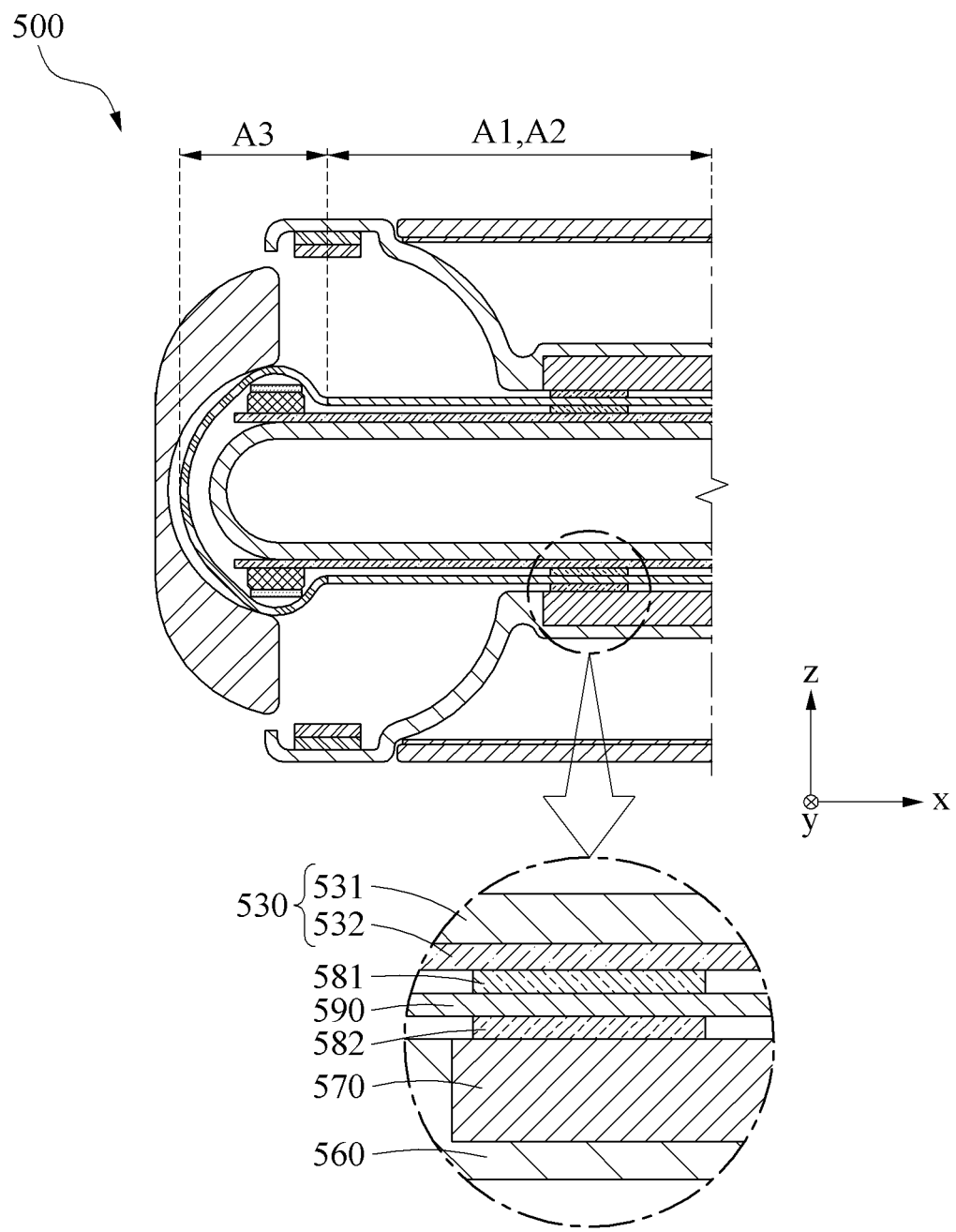
FIG. 5B is a cross-sectional view of an electronic device cut along a line Vb-Vb of FIG. 4B according to an embodiment of the disclosure.

FIG. 5B is a cross-sectional view of an electronic device cut along a line Vb-Vb of FIG. 4B according to an embodiment of the disclosure.

Referring to FIGS. 5A and 5B, an electronic device 500 according to an example embodiment may dissipate heat that is internally generated to the outside through a display 530. In an example embodiment, the electronic device 500 may include the display 530, a hinge assembly 560, a first PCB 571, a second PCB 572, a heat transfer member 590, a front heat dissipation member 581, and a rear heat dissipation member 582.

In an example embodiment, the heat transfer member 590 may include a first heat transfer area (A1) disposed on the rear surface of a first area of the display 530, a second heat transfer area (A2) disposed on the rear surface of a second area of the display 530, and a connecting area (A3) configured to connect the first heat transfer area (A1) and the second heat transfer area (A2). In an example embodiment, the front heat dissipation member 581 and the rear heat dissipation member 582 may serve to transfer the heat in a direction (e.g., a z-axis direction) from the rear surface to the front surface of the electronic device 500.

In an example embodiment, the front heat dissipation member 581 may be provided between the display 530 and the heat transfer member 590. For example, the front heat dissipation member 581 may form a heat transfer path between the heat transfer member 590 and the display 530 through connection to the rear surface of each of the heat transfer member 590 and the display 530. In an example embodiment, the front heat dissipation member 581 may include a first front heat dissipation member 581a that is provided to form a heat transfer path between the first heat transfer area (A1) and the first area and a second front heat dissipation member 581b that is provided to form a heat transfer path between the second heat transfer area (A2) and the second area. In an example embodiment, the display 530 may include display panel 531 and plates 532 configured to support the rear surface of the display panel (531). In an example embodiment, the plates 532 include a first plate 532a configured to support the rear surface of the first area of the display panel 531 and a second plate 532b configured to support the rear surface of the second area of the display panel 531. In this case, the first front heat dissipation member 581a may transfer heat of the heat transfer member 590 to the first plate 532a through physical contact with the first plate 532a and the first heat transfer area (A1) of the heat transfer member 590, and the second front heat dissipation member 581b may transfer heat of the heat transfer member 590 to the second plate 532b through physical contact with the second plate 532b and the second heat transfer area (A2) of the heat transfer member 590. In an example embodiment, the heat transferred to the first plate 532a and the second plate 532b may be conducted to the first area and the second area of the display 530 and may be dissipated to the outside of the electronic device 500.

In an example embodiment, the rear heat dissipation member 582 may be provided between the heat transfer member 590 and the PCBs 571 and 572 and may form heat transfer paths between the heat transfer member 590 and the PCBs 571 and 572. In an example embodiment, the rear heat dissipation member 582 may include a first rear heat dissipation member 582a configured to form the heat transfer path between the first heat transfer area (A1) of the heat transfer member 590 and the first PCB 571 and a second rear heat dissipation member 582b configured to form the heat transfer path between the second heat transfer area (A2) of the heat transfer member 590 and the second PCB 572. In an example embodiment, when the first PCB 571 and the second PCB 572 are supported by the hinge assembly 560 to face the rear surface of the display 530, the first rear heat dissipation member 582a may form the heat transfer path through physical contact with the first PCB 571 and the first heat transfer area (A1) of the heat transfer member 590, and the second rear heat dissipation member 582b may form the heat transfer path through direct contact with the second PCB 572 and the second heat transfer area (A2) of the heat transfer member 590. On the contrary, when the first PCB 571 and the second PCB 572 are provided to face the display 530 based on the hinge assembly 560, the rear heat dissipation member 582 may form indirect heat transfer paths between the PCBs 571 and 572 and the heat transfer member 590 through contact with the hinge assembly 560 and the heat transfer member 590.

In an example embodiment, based on a cross-section of FIG. 5A, the front heat dissipation member 581 and the rear heat dissipation member 582 may be provided to overlap each other based on the heat transfer member 590. That is, the front heat dissipation member 581 and the rear heat dissipation member 582 may overlap each other when viewed from the front surface of the display 530. For example, the first front heat dissipation member 581a and the first rear heat dissipation member 582a may be provided to overlap based on the first heat transfer area (A1) of the heat transfer member 590, and the second front heat dissipation member 581b and the second rear heat dissipation member 582b may be provided to overlap based on the second heat transfer area (A2) of the heat transfer member 590. According to the above structure, since a heat conduction path through the heat transfer member 590 has a shortest distance between the front heat dissipation member 581 and the rear heat dissipation member 582, heat of the PCBs 571 and 572 may be effectively transferred toward the display 530.

In an example embodiment, referring to FIG. 5B, when the electronic device 500 is in a folded state, the first area and the second area of the display 530 may face each other and an external exposed area for dissipating heat may decrease and an internal temperature of the electronic device 500 may increase accordingly. In this case, the electronic device 500 may perform a heat dissipation function between both spaces of the folded electronic device 500 through the heat transfer member 590 and may perform a heat dissipation function between the PCB 570 and the display 530 through the front heat dissipation member 581 and the rear heat dissipation member 582, thereby evenly distributing the heat all throughout the electronic device 500. Therefore, a temperature difference for each area of the electronic device 500 may be minimized.

Figure 6A:
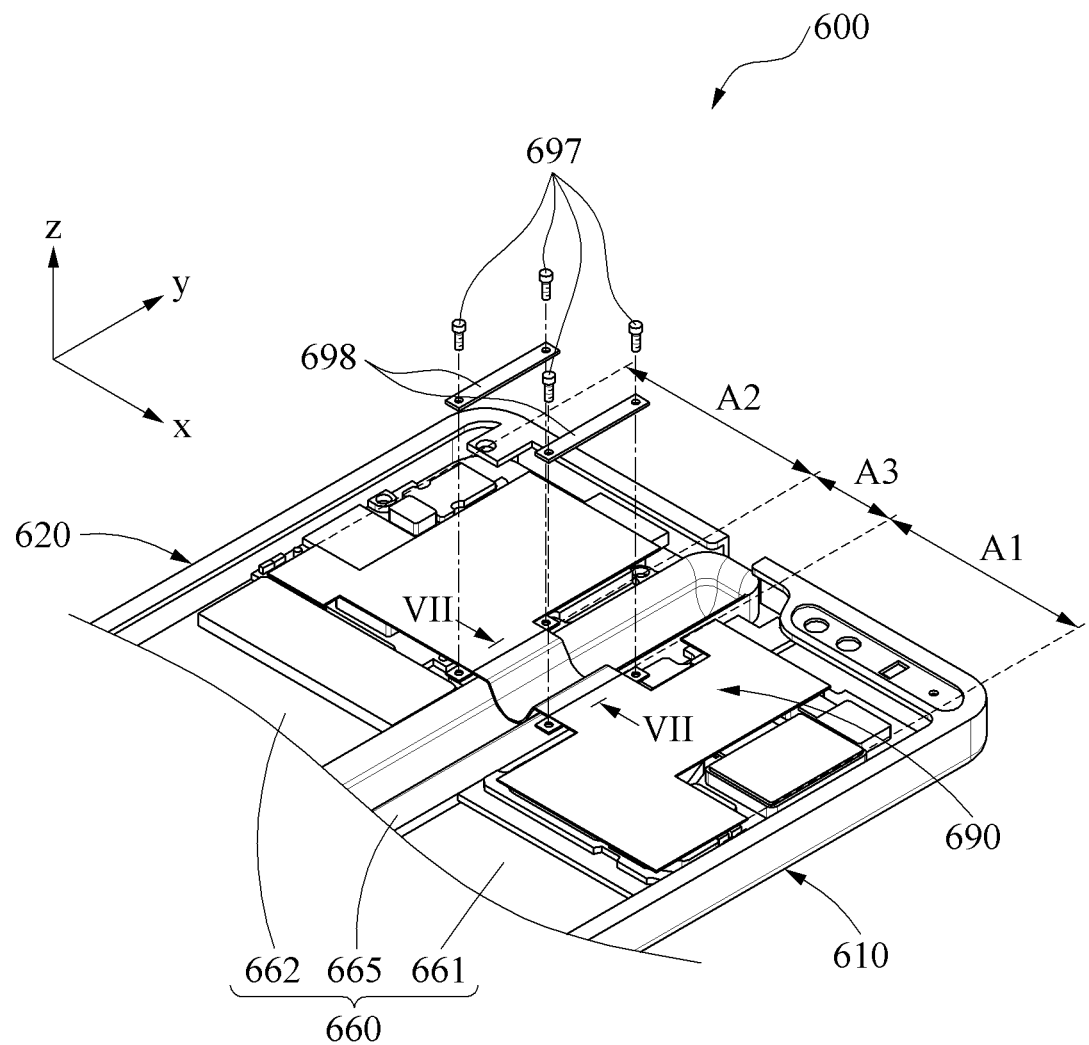
FIG. 6A is a perspective view of an electronic device illustrating a heat transfer member according to an embodiment of the disclosure.

FIG. 6A is a perspective view of an electronic device illustrating a heat transfer member according to an embodiment of the disclosure.

Figure 6B:
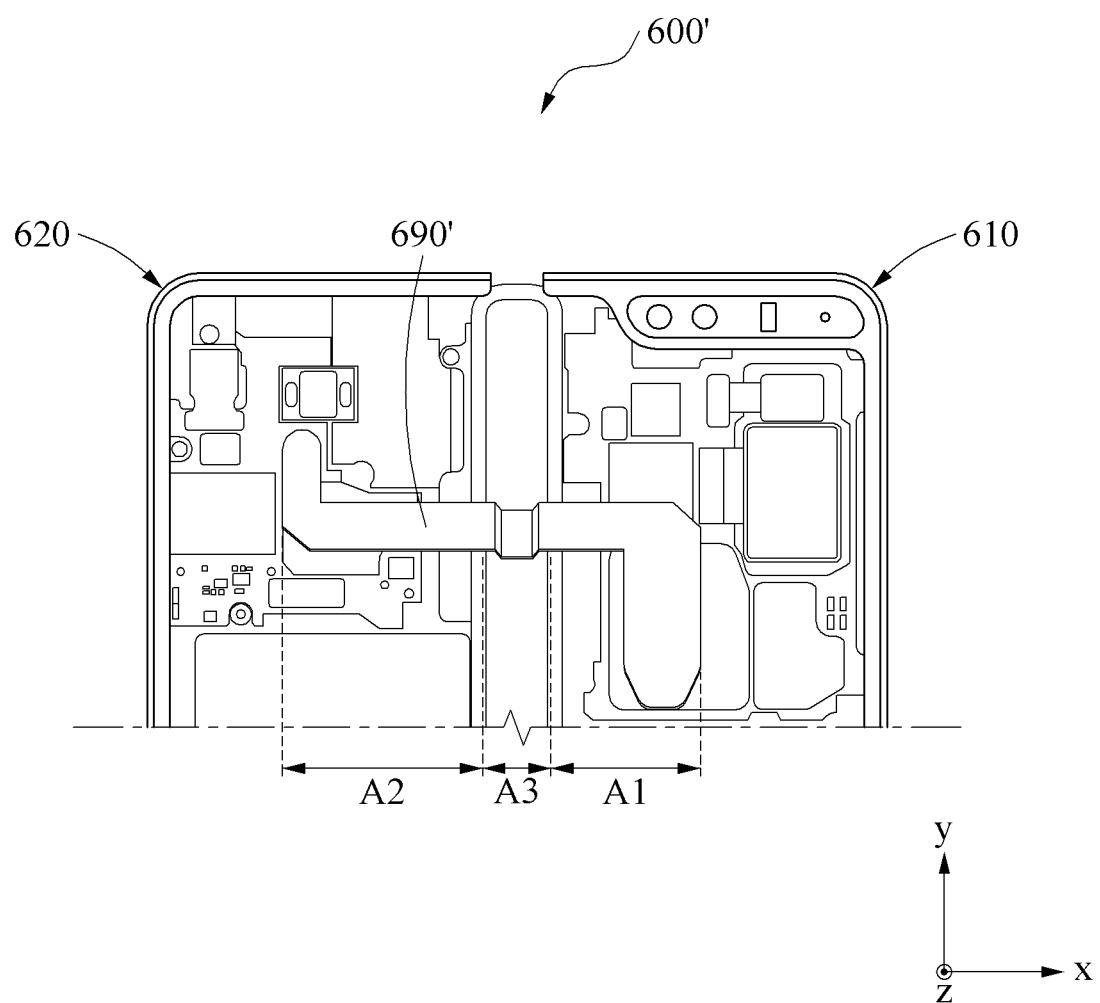
FIG. 6B is a top view of an electronic device illustrating a heat transfer member according to an embodiment of the disclosure.

FIG. 6B is a top view of an electronic device illustrating a heat transfer member according to an embodiment of the disclosure.

Referring to FIGS. 6A and 6B, an electronic device 600 (e.g., the electronic device 101 of FIG. 1, the electronic device 200 of FIG. 2A, and the electronic device 300 of FIG. 3A) according to an example embodiment may include a first housing 610, a second housing 620, a hinge assembly 660, a heat transfer member 690, and fastening members 697 and 698.

In an example embodiment, the heat transfer member 690 may be provided to cross the first housing 610 and the second housing 620. The heat transfer member 690 may include a first heat transfer area (A1) provided to the first housing 610, a second heat transfer area (A2) provided to the second housing 620, and a connecting area (A3) configured to connect the first heat transfer area (A1) and the second heat transfer area (A2). In an example embodiment, the first heat transfer area (A1) and the second heat transfer area (A2) may be formed in various shapes in consideration of a shape of the electronic device 600 and arrangement of parts mounted inside the electronic device 600. In an example embodiment, the overall shape of the heat transfer member 690 may be transformed since the connecting area (A3) bends in response to a folding motion of the electronic device 600. In an example embodiment, each area of the heat transfer member 690 may be formed of a different material. For example, the first heat transfer area (A1) and the second heat transfer area (A2) of the heat transfer member 690 may include a metallic material and the connecting area (A3) may include a flexible material.

In an example embodiment, to prevent an installation position of the heat transfer member 690 relative to the electronic device 600 in a process in which the shape of the heat transfer member 690 is transformed in response to a folding motion of the electronic device 600, the fastening members 697 and 698 may fasten the first heat transfer area (A1) and the second heat transfer area (A2) of the heat transfer member 690 to the first housing 610 and the second housing 620, respectively. For example, referring to FIG. 6A, the fastening members 697 and 698 may fasten the heat transfer member 690 to the hinge assembly 660. In an example embodiment, the hinge assembly 660 may include a first support plate 661 connected to the first housing 610, a second support plate 662 connected to the second housing 620, and a hinge cover 665 configured to connect the first support plate 661 and the second support plate 662. In this case, the fastening members 697 and 698 may include a screw 697 and a bracket 698 for fastening the first heat transfer area (A1) and the second heat transfer area (A2) of the heat transfer member 690 to the first support plate 661 and the second support plate 662, respectively. According to the above structure, since the first heat transfer area (A1) and the second heat transfer area (A2) of the heat transfer member 690 are integrally formed with the first support plate 661 and the second support plate 662 through the fastening members 697 and 698, respectively, it is possible to prevent misalignment of positions of the first heat transfer area (A1) and the second heat transfer area (A2) relative to a single pair of housings 610, 620 due to stress caused by bending of the connecting area (A3). However, a method of fastening the heat transfer member 690 through the fastening members 697 and 698 is provided as an example only. A method of fastening a position of the heat transfer member 690 relative to the housings 610 and 620 is not limited thereto. For example, the brackets 698 may be omitted and the heat transfer member 690 may be fastened to the first support plate 661 and the second support plate 662 through the screws 697.

In an example embodiment, the heat transfer member 690 may be at least one of a heat chamber and a heat pipe. For example, the electronic device 600 may include the heat transfer member 690 in a form of a heat chamber illustrated in FIG. 6A. Unlike this, an electronic device 600' may include a heat transfer member 690' in a form of a heat pipe illustrated in FIG. 6B.

Figure 7:
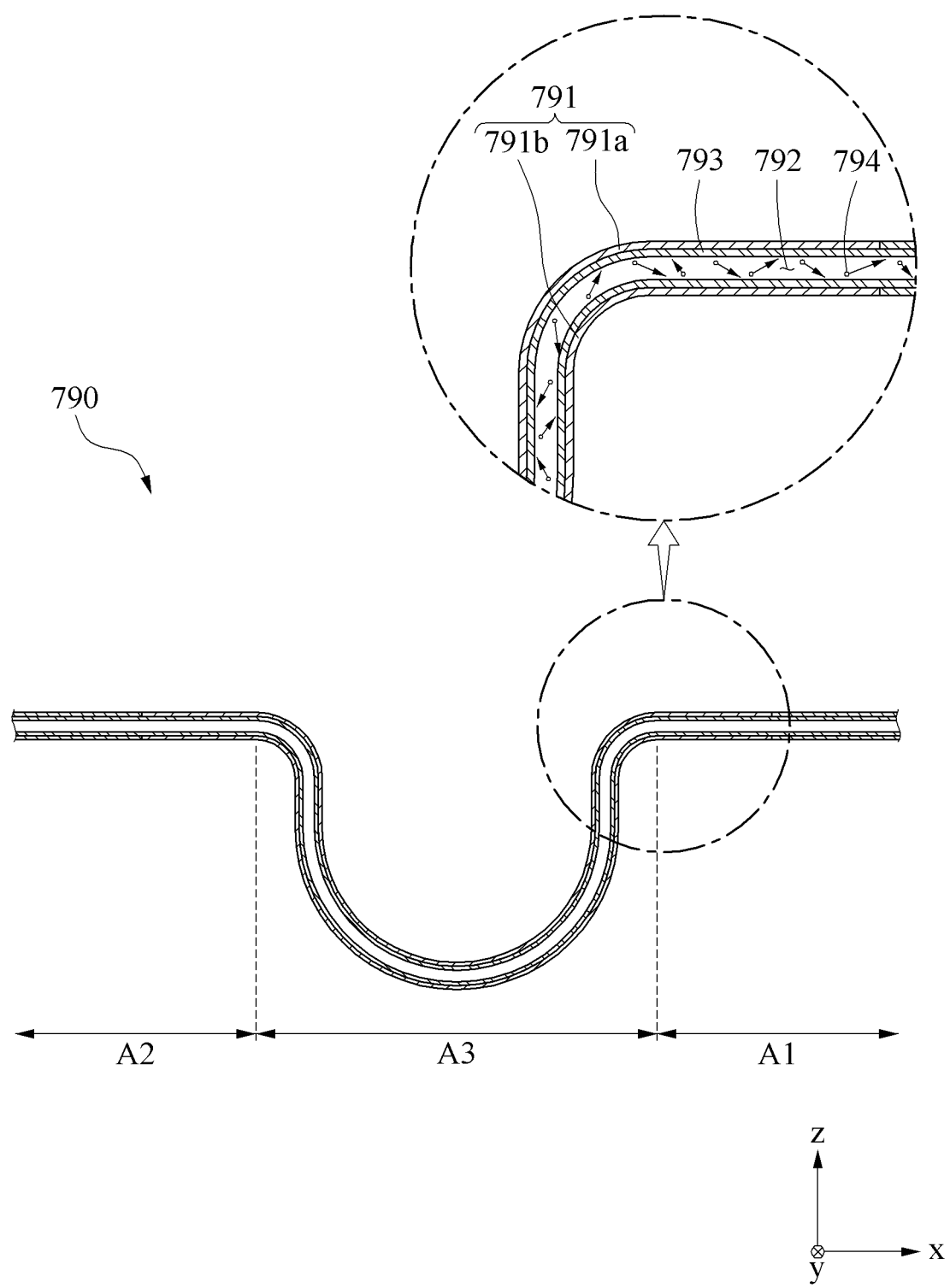
FIG. 7 is a cross-sectional view of a heat transfer member cut along a line VII-VII of FIG. 6A according to an embodiment of the disclosure.

FIG. 7 is a cross-sectional view of a heat transfer member cut along a line VII-VII of FIG. 6A according to an embodiment of the disclosure.

Figure 8A:
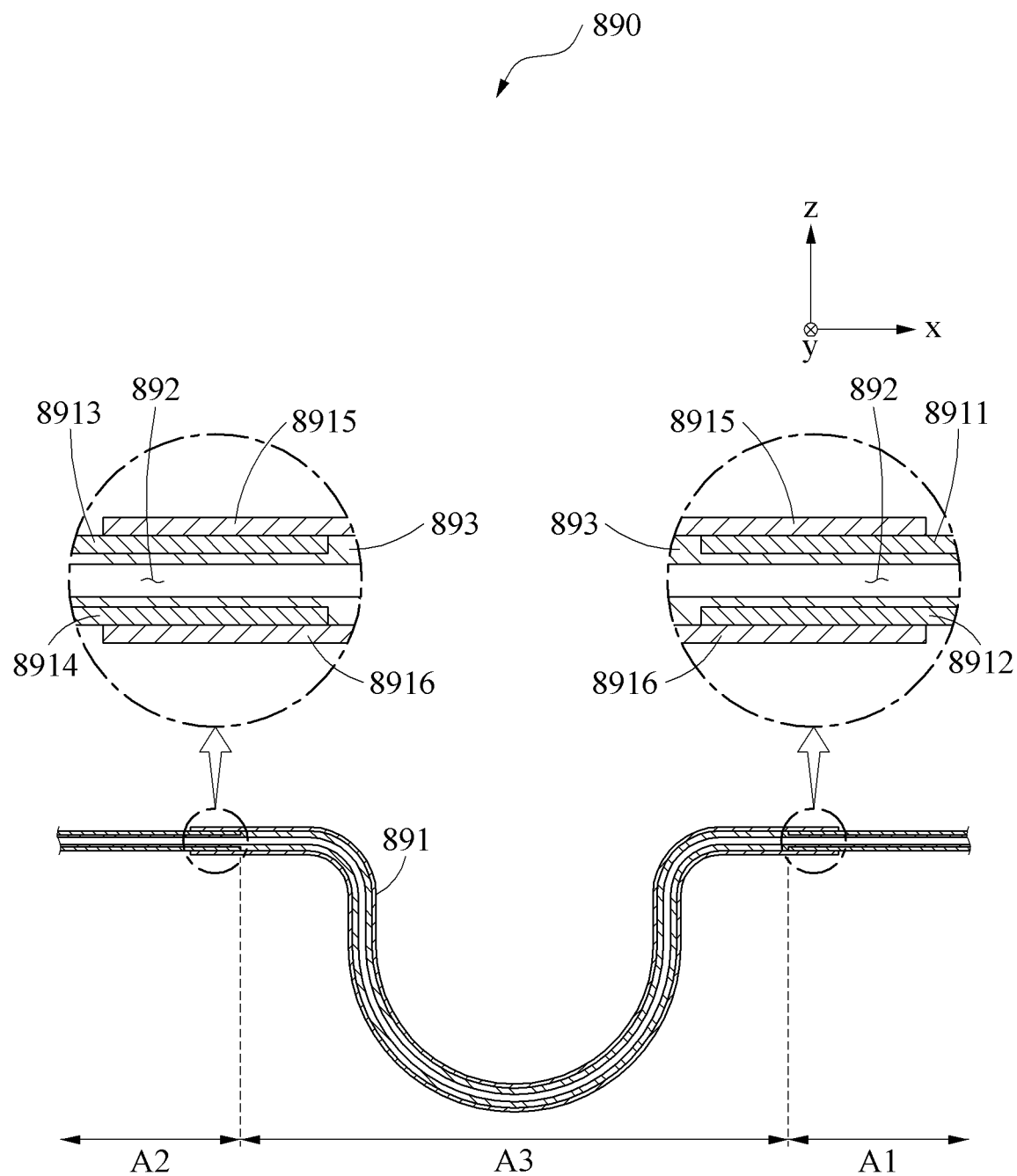
FIG. 8A is a cross-sectional view of a heat transfer member cut along a line VII-VII of FIG. 6A according to an embodiment of the disclosure.

FIG. 8A is a cross-sectional view of a heat transfer member cut along a line VII-VII of FIG. 6A according to an embodiment of the disclosure.

Figure 8B:
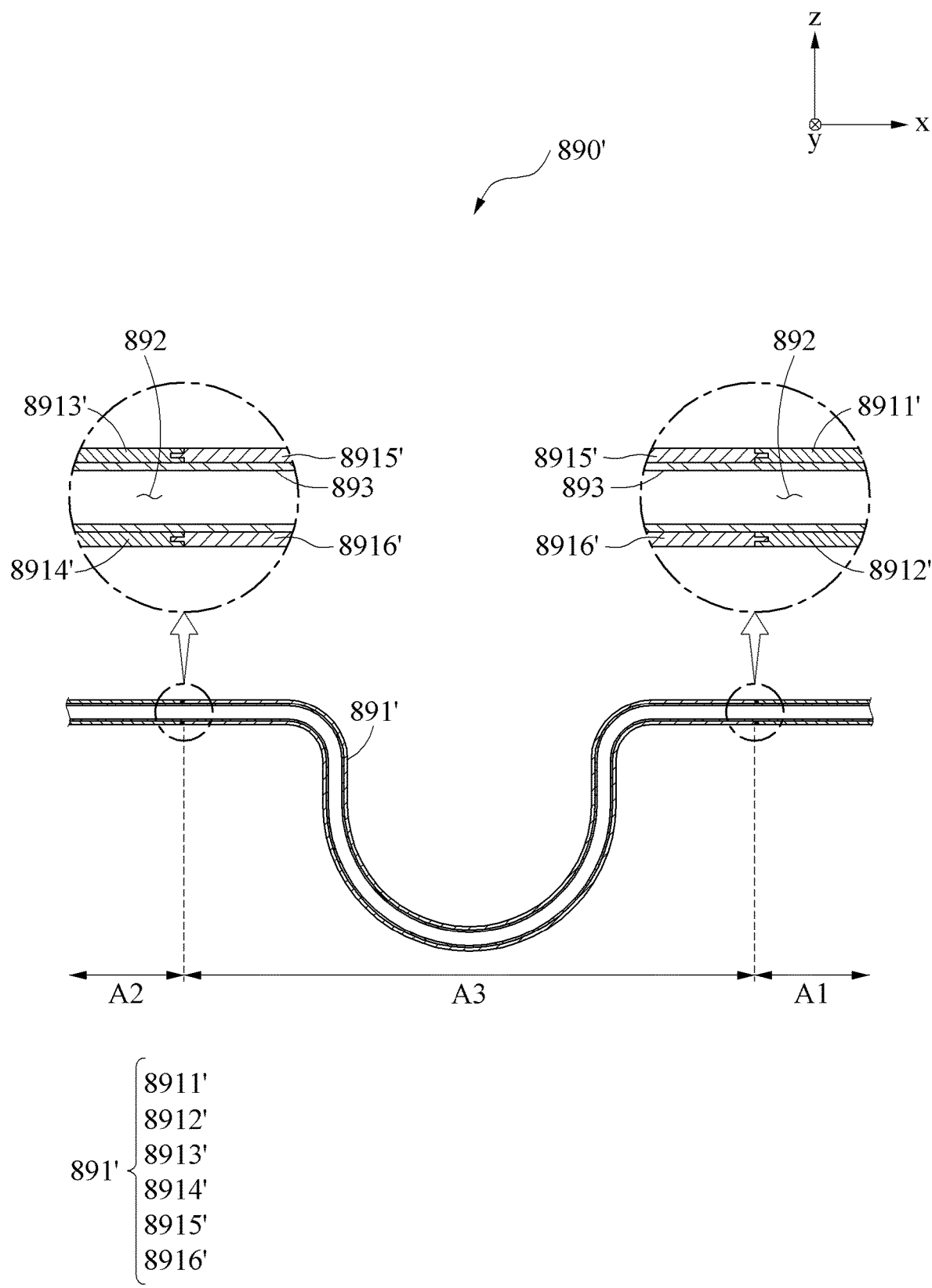
FIG. 8B is a cross-sectional view of a heat transfer member cut along a line VII-VII of FIG. 6A according to an embodiment of the disclosure.

FIG. 8B is a cross-sectional view of a heat transfer member cut along a line VII-VII of FIG. 6A according to an embodiment of the disclosure.

Figure 9:
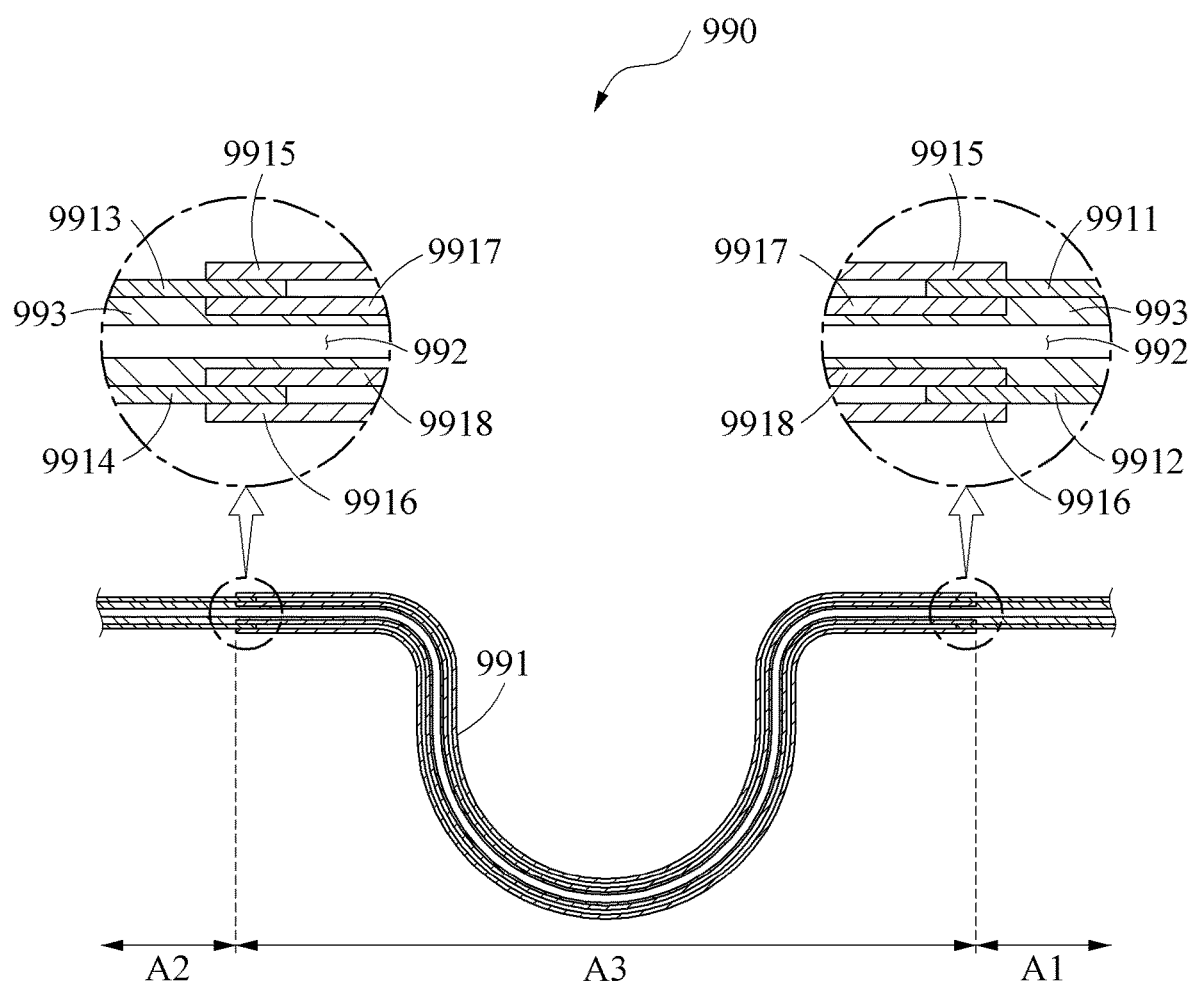
FIG. 9 is a cross-sectional view of a heat transfer member cut along a line VII-VII of FIG. 6A according to an embodiment of the disclosure.

FIG. 9 is a cross-sectional view of a heat transfer member cut along a line VII-VII of FIG. 6A according to an embodiment of the disclosure.

Figure 10:
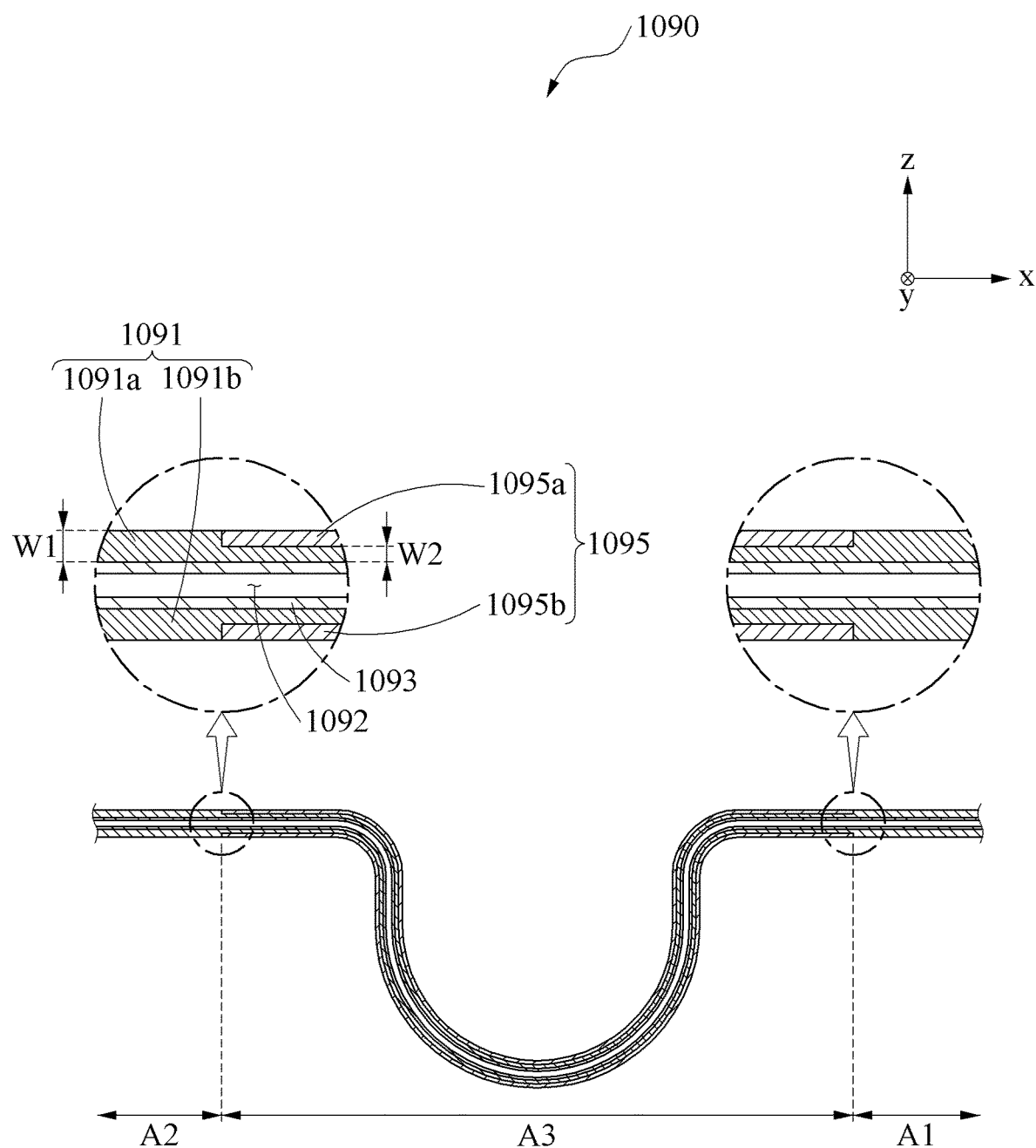
FIG. 10 is a cross-sectional view of a heat transfer member cut along a line VII-VII of FIG. 6A according to an embodiment of the disclosure.

FIG. 10 is a cross-sectional view of a heat transfer member cut along a line VII-VII of FIG. 6A according to an embodiment of the disclosure.

Figure 11:
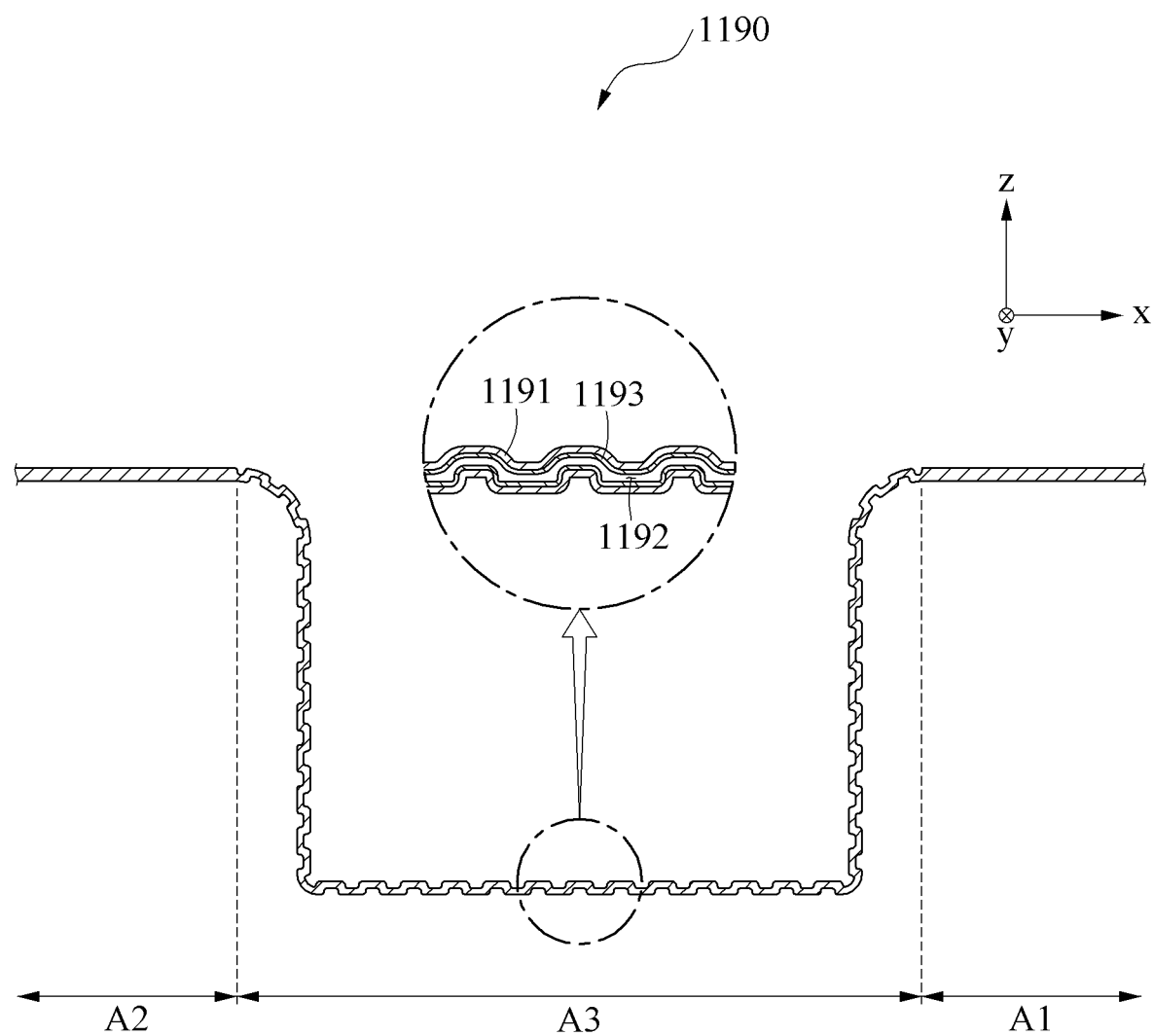
FIG. 11 is a cross-sectional view of a heat transfer member cut along a line VII-VII of FIG. 6A according to an embodiment of the disclosure.

FIG. 11 is a cross-sectional view of a heat transfer member cut along a line VII-VII of FIG. 6A according to an embodiment of the disclosure.

Figure 12:
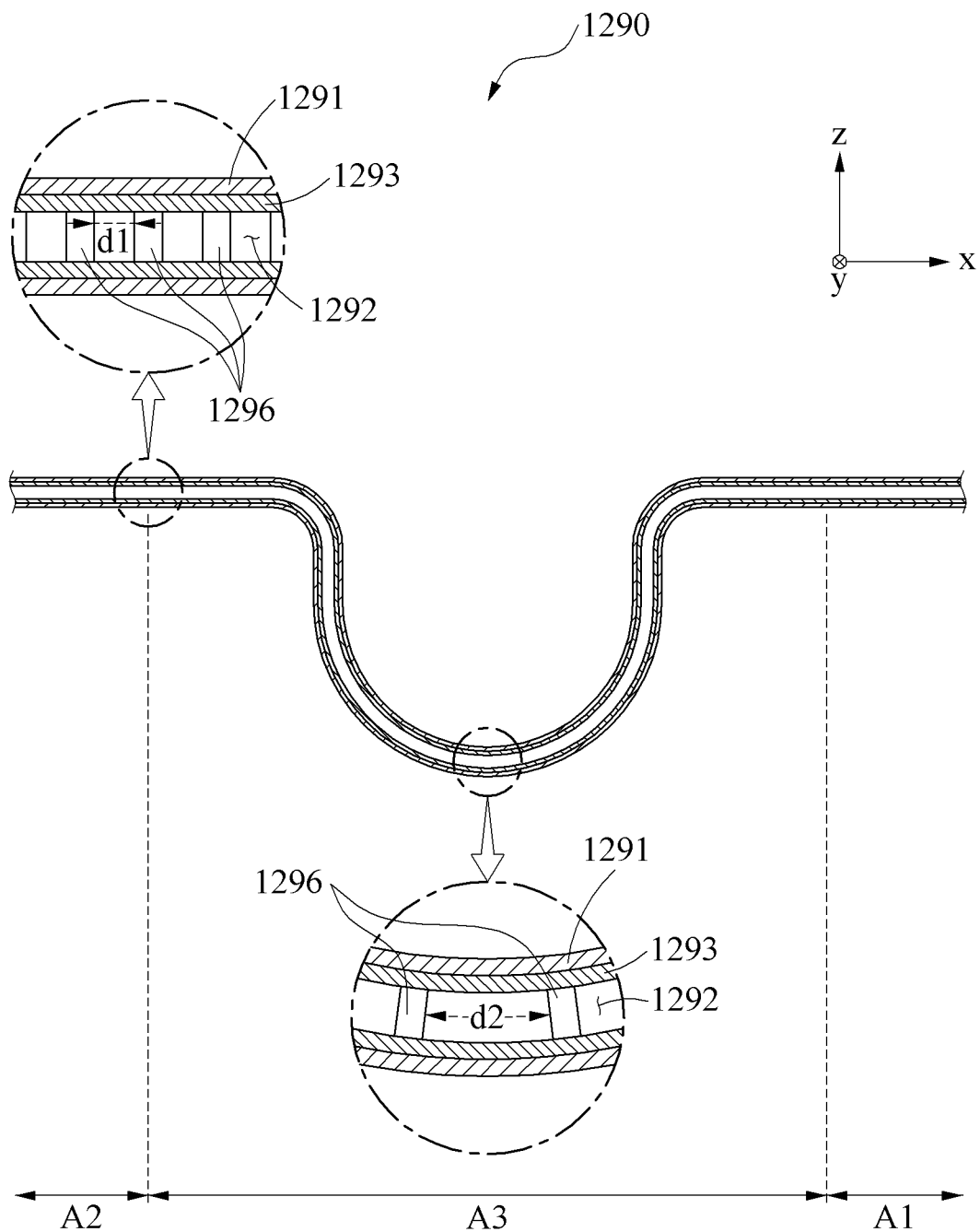
FIG. 12 is a cross-sectional view of a heat transfer member according to an embodiment of the disclosure.

FIG. 12 is a cross-sectional view of a heat transfer member according to an example embodiment according to an embodiment of the disclosure.

FIGS. 7, 8A, 8B, 9 to 11, and 12 are views to describe a heat transfer member according to various embodiments of the disclosure. Unless the relevant context clearly indicates otherwise, it can be understood that the heat transfer member illustrated in each drawing is provided to an electronic device as in a state of FIG. 6A. Also, when describing each drawing, like terms refer to like components unless the relevant context clearly indicates otherwise.

Referring to FIG. 7, a heat transfer member 790 (e.g., the heat transfer member 690 of FIG. 6A) according to an example embodiment may include a first heat transfer area (A1), a second heat transfer area (A2), and a connecting area (A3) configured to connect the first heat transfer area (A1) and the second heat transfer area (A2) according to an arrangement position relative to the electronic device (e.g., the electronic device 600 of FIG. 6A). In an example embodiment, the heat transfer member 790 may include a heat transfer space 792 internally formed, a cover 791 configured to surround the heat transfer space 792 and to form an appearance, a heat transfer fluid 794 accommodated in the heat transfer space 792, and a wick structure 793 formed on an inner wall of the heat transfer space 792.

The heat transfer space 792 may be formed inside the heat transfer member 790. In an example embodiment, the heat transfer space 792 may be formed and connected from the first heat transfer area (A1) to the second heat transfer area (A2) through the connecting area (A3). That is, the heat transfer space 792 may be integrally formed along each area of the heat transfer member 790.

The cover 791 may surround the heat transfer space 792 and may form the appearance of the heat transfer member 790. In an example embodiment, referring to FIG. 7, based on a cross-section of the heat transfer member 790, the cover 791 may be divided into a single pair of cover surfaces 791a and 791b based on the heat transfer space 792. The single pair of cover surfaces 791a and 791b may seal the heat transfer space 792 by being bonded along the edge.

In an example embodiment, the cover 791 may be formed of a different material for each area of the heat transfer member 790. For example, the cover 791 may be formed of a metallic material having high thermal conductivity in the first heat transfer area (A1) and the second heat transfer area (A2), and may be formed of a bendable flexible material in the connecting area (A3). According to the above structure, the cover 791 may effectively absorb or dissipate heat in the first heat transfer area (A1) and the second heat transfer area (A2), which may lead to improving thermal transfer effect inside the electronic device and to flexible folding in response to a folding motion of the electronic device in the connecting area (A3).

The heat transfer fluid 794 may be accommodated in the heat transfer space 792. In an example embodiment, the heat transfer fluid 794 may move between the first heat transfer area (A1) and the second heat transfer area (A2) through the heat transfer space 792. The heat transfer fluid 794 may serve to absorb heat transferred to a portion of the heat transfer member 790 through the cover 791 and to transfer the heat to another portion of the heat transfer member 790 by moving along the heat transfer space 792. In an example embodiment, the heat transfer fluid 794 may undergo a phase change in a liquid state or a gaseous state according to a temperature. For example, the heat transfer fluid 794 may internally store heat energy by being present in a liquid state below a specific temperature and in a gaseous state at the specific temperature or more. In an example embodiment, when a temperature of each area of the heat transfer member 790 is different, the heat transfer fluid 794 present in a high temperature area of the heat transfer member 790 may absorb the heat energy and may transition the heat energy into a gaseous state, and may move to a relatively low temperature area through the heat transfer space 792. In this case, the heat transfer fluid 794 that moves to the low temperature area of the heat transfer member 790 may be liquefied into a liquid state while dissipating heat to the outside of the heat transfer member 790. That is, heat distribution to the entire heat transfer member 790 may be performed through free migration of the heat transfer fluid 794 in the heat transfer space 792.

The wick structure 793 may be formed on the inner wall of the heat transfer space 792, that is, the inner surface of the cover 791. The wick structure 793 refers to a structure that implements a capillary action and may include pores formed such that the fluid may move. In an example embodiment, the wick structure 793 may be implemented in a form of, such as a metal powder sintered body applied to the inside of the cover 791, a wire structure, or a mesh. In an example embodiment, the wick structure 793 may serve to move the heat transfer fluid 794 in a liquid state. For example, when the heat transfer fluid 794 in a gaseous state moves to a relatively low temperature area of the heat transfer member 790 and heat is discharged, the heat transfer fluid 794 may condense and may undergo a phase change into a liquid state. In this case, the heat transfer fluid 794 condensed in the liquid state may be absorbed in the wick structure 793 and may move to another area of the heat transfer member 790 along the wick structure 793 through a capillary action.

According to the above structure, the heat transfer member 790 may perform a heat dissipation function between the first heat transfer area (A1) and the second heat transfer area (A2) through heat conduction through the cover 791 and, at the same time, may perform a secondary heat dissipation function through phase change and migration of the heat transfer fluid 794 accommodated in the heat transfer space 792. For example, the heat transfer fluid 794 may perform a heat dissipation function between the respective areas of the heat transfer member 790 by absorbing heat in a high temperature area and evaporating and then moving to another area through the heat transfer space 792 and discharging heat in a low temperature area and being liquefied. In this case, since the heat transfer fluid 794 in a liquescent state moves to each area of the heat transfer member 790 along the wick structure 793, it is possible to prevent the heat transfer fluid 794 from concentrating in a specific area of the transfer space 792.

Referring to FIG. 8A, a heat transfer member 890 according to an example embodiment may include a cover 891, a heat transfer space 892, a wick structure 893 formed on an inner wall of the heat transfer space 892, and a heat transfer fluid (e.g., the heat transfer fluid 794 of FIG. 7) accommodated in the heat transfer space 892.

In an example embodiment, the cover 891 may be formed of different materials in a first heat transfer area (A1), a second heat transfer area (A2), and a connecting area (A3). For example, the first heat transfer area (A1) and the second heat transfer area (A2) of the cover 891 may be formed of a metallic material with high thermal conductivity and the connecting area (A3) of the cover 891 may be formed of a flexible material. For example, the connecting area (A3) of the cover 891 may be formed of a composite material that includes ultrathin glass (UTG), polyimide (PI), and carbon fiber, or a composite material that includes at least one thereof.

In an example embodiment, the respective areas of the cover 891 formed of different materials may be bonded to each other. For example, referring to FIG. 8A, based on a cross-section perpendicular to a folding axis (e.g., the folding axis (A) of FIG. 4A), the cover 891 may include a first cover portion 8911 provided in the first heat transfer area (A1), a second cover portion 8912 provided in the first heat transfer area (A1) to face the first cover portion 8911 based on the heat transfer space 892, a third cover portion 8913 provided in the second heat transfer area (A2), a fourth cover portion 8914 provided in the second heat transfer area (A2) to face the second cover portion 8912 based on the heat transfer space 892, a first connecting portion 8915 of which at least a portion is provided in the connecting area (A3) and of which both sides are overlappingly connected to the first cover portion 8911 and the third cover portion 8913, respectively, and a second connecting portion 8916 of which at least a portion is provided in the connecting area (A3) and of which both sides are overlappingly connected to the second cover portion 8912 and the fourth cover portion 8914, respectively.

In an example embodiment, referring to FIG. 8A, the first connecting portion 8915 may be connected to cover at least a portion of the outer surface of the first cover portion 8911 and the third cover portion 8913, and the second connecting portion 8916 may be connected to cover at least a portion of the outer surface of the second cover portion 8912 and the fourth cover portion 8914. However, it is provided as an example only and a method of connecting each portion of the cover 891 is not limited thereto. For example, in another example embodiment, the first connecting portion 8915 may be connected to cover the outer surface overlapped by one of the first cover portion 8911 and the third cover portion 8913, and the second connecting portion 8916 may be connected to cover the outer surface overlapped by one of the second cover portion 8912 and the fourth cover portion 8914.

Referring to FIG. 8B, in an example embodiment, a heat transfer member 890' may be bonded such that each overlapping portion of the cover 891' may not have a step difference. For example, both ends of a first connecting portion 8915' may be in a shape that engages with ends of a first cover portion 8911' and a third cover portion 8913' such that the outer surface of a portion connected to the first cover portion 8911' and the third cover portion 8913' may not be stepped. Both ends of a second connecting portion 8916' may be in a shape that engages with ends of a second cover portion 8912' and a fourth cover portion 8914' such that the outer surface of a portion connected to the second cover portion 8912' and the fourth cover portion 8914' may not be stepped. For example, referring to FIG. 8B, the respective portions of the cover 891' may be interconnected in a male-female engagement form. However, it is provided as an example only and a method of connecting the respective overlapping portions of the cover 891' is not limited thereto.

Referring to FIG. 9, a heat transfer member 990 may include a cover 991, a heat transfer space 992, a wick structure 993, and a heat transfer fluid (e.g., the heat transfer fluid 794 of FIG. 7).

In an example embodiment, based on a cross-section perpendicular to a folding axis, the cover 991 may include a first cover portion 9911 and a second cover portion 9912 provided in a first heat transfer area (A1) based on the heat transfer space 992, a third cover portion 9913 and a fourth cover portion 9914 provided in a second heat transfer area (A2) based on the heat transfer space 992, a first connecting portion 9915 and a second connecting portion 9916 of which at least a portion is provided in a connecting area (A3) based on the heat transfer space 992, and a third connecting portion 9917 and a fourth connecting portion 9918 of which at least a portion is provided in the connecting area (A3).

In an example embodiment, the first connecting portion 9915 may be bonded such that both sides thereof may cover at least a portion of the outer surface of the first cover portion 9911 and the third cover portion 9913, respectively, and the second connecting portion 9916 may be bonded such that both sides thereof may cover at least a portion of the outer surface of the second cover portion 9912 and the fourth cover portion 9914, respectively.

In an example embodiment, the third connecting portion 9917 may be connected such that at least a portion thereof may be provided in the connecting area (A3) and both sides thereof may cover the inner surface of the first cover portion 9911 and the third cover portion 9913, respectively. That is, the outer surface and the inner surface of the first cover portion 9911 and the third cover portion 9913 may be covered by the first connecting portion 9915 and the third connecting portion 9917, respectively. In an example embodiment, the fourth connecting portion 9918 may be connected such that at least a portion thereof may be provided in the connecting area (A3) and both sides thereof may cover the inner surface of the second cover portion 9912 and the fourth cover portion 9914, respectively. That is, the outer surface and the inner surface of the second cover portion 9912 and the fourth cover portion 9914 may be covered by the second connecting portion 9916 and the fourth connecting portion 9918, respectively. In this case, based on a cross-section of the heat transfer member 990, the fourth connecting portion 9918 may be provided to face the third connecting portion 9917 based on the heat transfer space 992. In an example embodiment, the third connecting portion 9917 and the fourth connecting portion 9918 may be formed in a form of layers stacked on the inner surface of the first connecting portion 9915 and the second connecting portion 9916, respectively.

In an example embodiment, an air gap may be formed or a member formed of a heat-insulating material may be provided in a space between connecting portions (9915, 9916, 9917, 9918), for example, between the first connecting portion 9915 and the third connecting portion 9917 or between the second connecting portion 9916 and the fourth connecting portion 9918 excluding an area in which cover portions (9911, 9912, 9913, 9914) are provided. For example, when the second connecting portion 9916 is provided toward a hinge cover (e.g., the hinge cover 655 of FIG. 6A), a heat-insulating material may be provided or an air layer may be formed to prevent heat of the heat transfer member 990 from being transferred to the hinge cover by preventing air between the second connecting portion 9916 and the fourth connecting portion 9918 and by preventing the heat transfer between the second connecting portion 9916 and the fourth connecting portion 9918.

According to the above structure, when each area of the cover 991 is formed of a different material, for example, when the first heat transfer area (A1) and the second heat transfer area (A2) of the cover 991 are formed of a metallic material (e.g., copper) and the connecting area (A3) is formed of a flexible material, the cover 991 may be bonded in such a manner that a cover portion of a heat transfer area formed of a metallic material inserts into a cover portion of a flexible connecting area formed of a flexible material.

Referring to FIG. 10, a heat transfer member 1090 according to an example embodiment may include a cover 1091, a heat transfer space 1092, a wick structure 1093, a heat transfer fluid (e.g., the heat transfer fluid 794 of FIG. 7), and a reinforcement member 1095.

In an example embodiment, the entire area of the cover 1091 may be formed of the same material. For example, all of a first heat transfer area (A1), a second heat transfer area (A2), and a connecting area (A3) of the cover 1091 may be formed of a metallic material. On the contrary, unlike this, the entire area of the cover 1091 may be formed of a flexible material, such as UTG. According to the above structure, unlike a case in which each area of the cover 1091 is formed of a different material, the entire area of the cover 1091 may be integrally formed. In an example embodiment, based on a cross-section perpendicular to a folding axis, the cover 1091 may have a different thickness for each area. For example, the connecting area (A3) of the cover 1091 may be formed to have a relatively thin thickness (W2) compared to a thickness (W1) of the first heat transfer area (A1) and the second heat transfer area (A2). According to the above structure, the connecting area A3 of the cover 1091 may have stress resistance according to bending relatively compared to the heat transfer area A1, A2. In particular, when the cover 1091 is formed of a metallic material, a more flexible bending function of the connecting area (A3) may be secured.

In an example embodiment, the reinforcement member 1095 may be attached to the outer surfaces (1091, 1091*b*) of the cover 1091, thereby reinforcing strength of the connecting area (A3). In an example embodiment, the reinforcement member 1095 may be attached to the outer surface of the connecting area (A3) of the cover 1091 formed with a relatively thin thickness. Referring to FIG. 10, based on a cross-section perpendicular to the folding axis, the reinforcement member 1095 may include a first reinforcement member 1095*a* and a second reinforcement member 1095*b* attached to both outer surfaces of the cover 1091, respectively. In an example embodiment, the reinforcement member 1095 may have a thickness that is not stepped from the outer surface of the heat transfer area (A1, A2) of the cover 1091 based on a state in which the reinforcement member 1095 is attached to the outer surface of the connecting area (A3). That is, a sum of thicknesses of the reinforcement member 1095 and the connecting area (A3) of the cover 1091 may be substantially identical to a thickness of the heat transfer area (A1, A2) of the cover 1091.

In an example embodiment, the reinforcement member 1095 may be formed of a material different from that of the cover 1091. For example, when the cover 1091 is formed of a metallic material such as copper, the reinforcement member 1095 may be formed of a flexible material, such as UTG, PI, or carbon fiber composite material. When the connecting area (A3) of the cover 1091 is damaged due to a repetitive bending motion, the reinforcement member 1095 may serve to prevent leakage of a heat transfer fluid accommodated in the heat transfer space 1092 to the outside of the heat transfer member 1090.

Referring to FIG. 11, a heat transfer member 1190 according to an example embodiment may include a cover 1191, a heat transfer space 1192, a wick structure 1193, and a heat transfer fluid (e.g., the heat transfer fluid 794 of FIG. 7).

In an example embodiment, the entire area of the cover 1191 may be formed of a metallic material. For example, a first heat transfer area (A1), a second heat transfer area (A2), and a connecting area (A3) of the cover 1191 may be integrally formed using the same metallic material, for example, copper. The heat transfer space 1192 integrally formed along the entire area of the heat transfer member 1190 and in which the heat transfer fluid is accommodated may be formed in the cover 1191. In an example embodiment, the wick structure 1193 for moving the heat transfer fluid in a liquid state may be formed on an inner wall of the heat transfer space 1192, that is, on the inner surface of the cover 1191.

In an example embodiment, the heat transfer member 1190 may include a plurality of bending portions formed in the connecting area (A3). For example, referring to FIG. 11, based on a cross-section perpendicular to a folding axis, the connecting area (A3) of the heat transfer member 1190 may include a plurality of bending portions that bends based on a plurality of bending shafts parallel to the folding axis. In an example embodiment, the connecting area (A3) of the heat transfer member 1190 may bend along the folding axis through the plurality of bending portions. That is, a bending motion may be flexibly implemented in the connecting area (A3) of the heat transfer member 1190 in such a manner that the plurality of bending portions of the heat transfer member 1190 bends based on the bending shaft in response to a folding motion of the electronic device. According to the above structure, even when the entire area of the cover 1191 is formed of a metallic material, a flexible bending motion of the connecting area (A3) may be implemented.

Referring to FIG. 12, a heat transfer member 1290 according to an example embodiment may include a cover 1291, a heat transfer space 1292, a wick structure 1293, a heat transfer fluid (e.g., the heat transfer fluid 794 of FIG. 7), and a plurality of fillers 1296.

In an example embodiment, the heat transfer space 1292 may be formed inside the cover 1291. The heat transfer space 1292 may be integrally formed along the inside of the cover 1291 and connected a first heat transfer area (A1), a connecting area (A3), and a second heat transfer area (A2). In an example embodiment, the heat transfer fluid that performs a heat dissipation function for each area of the heat transfer member 1290 through a phase change may be accommodated in the heat transfer space 1292. In an example embodiment, the wick structure 1293 for moving the heat transfer fluid in a liquid state through a capillary action may be formed on an inner wall of the heat transfer space 1292.

In an example embodiment, the filler 1296 may be provided in the heat transfer space 1292 and may secure a spacing of the heat transfer space 1292 for the heat transfer fluid to move. For example, referring to FIG. 12, based on a cross-section of the heat transfer member 1290 perpendicular to a folding axis, the plurality of fillers 1296 may be provided in the heat transfer space 1292 to prevent inner surfaces of the cover 1291 forming the heat transfer space 1292 from contacting each other. That is, a distance between the inner surfaces of the cover 1291 may be secured through the plurality of fillers 1296. In an example embodiment, the heat transfer fluid in a gaseous state may move to each area of the heat transfer member 1290 through the heat transfer space 1292. In this case, the fillers 1296 may prevent the distance between the inner faces of the cover 1291 facing each other from excessively narrowing according to an external force (e.g., a pressing phenomenon caused by an impact or other parts) applied from the outside or a folding motion. Therefore, the heat transfer member 1290 may secure a minimum spacing of the heat transfer space 1292 sufficient for the heat transfer fluid in the gaseous state to move through the fillers 1296. In an example embodiment, the filler 1296 may insert into the heat transfer space 1292 in a form of a filling agent, a mesh structure, and a wire.

In an example embodiment, the plurality of fillers 1296 may be provided in the heat transfer space 1292 along each area of the heat transfer member 1290. In this case, distances between the plurality of fillers 1296 provided in the respective areas of the heat transfer member 1290 may differ from each other. For example, referring to FIG. 12, based on a cross-section perpendicular to the folding axis, a distance d2 between the plurality of fillers 1296 provided in the connecting area (A3) may be a wider than a distance d1 between the plurality of fillers 1296 provided in the heat transfer area (A1, A2). According to the above structure, since the plurality of fillers 1296 is provided to have a relatively wide distance therebetween in the connecting area (A3), interference of a bending motion by the filler 1296 in a process in which the connecting area (A3) bends relatively decreases. Also, since the plurality of fillers 1296 is provided to have a relatively narrow distance therebetween in the heat transfer area (A1, A2), degradation in migration of the heat transfer fluid in the heat transfer area (A1, A2) may be prevented.

Figure 13:
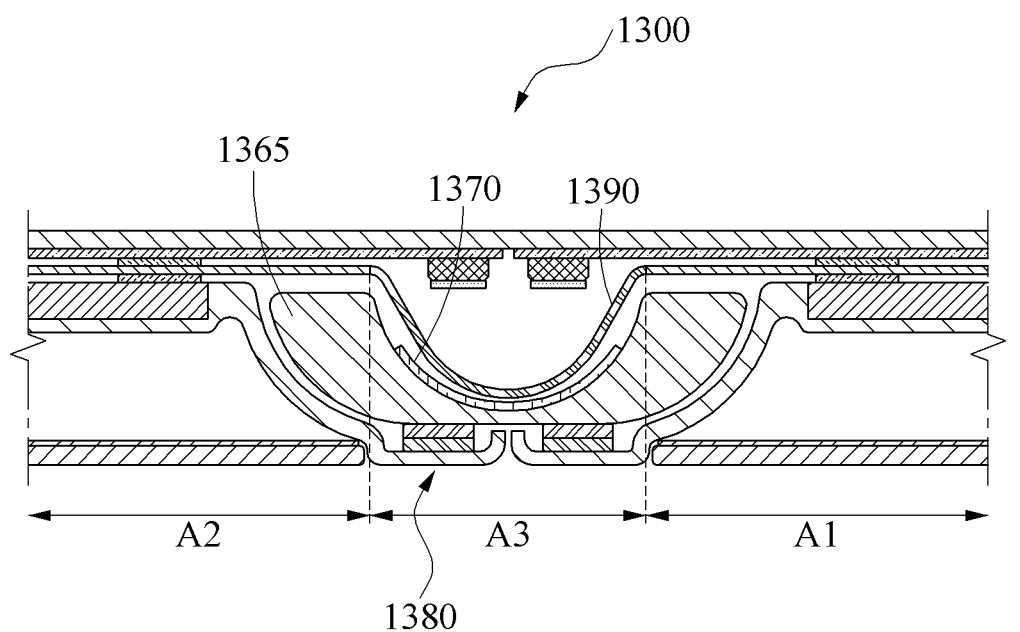
FIG. 13 is a cross-sectional view of an electronic device according to an embodiment of the disclosure.

FIG. 13 is a cross-sectional view of an electronic device according to an embodiment of the disclosure.

Referring to FIG. 13, an electronic device 1300 according to an example embodiment may include a heat transfer member 1390, a hinge structure 1380, a hinge cover 1365, and a heat shield member 1370.

In an example embodiment, the heat transfer member 1390 may include a first heat transfer area (A1), a second heat transfer area (A2), and a connecting area (A3). In an example embodiment, the connecting area (A3) may connect the first heat transfer area (A1) and the second heat transfer area (A2), and may be provided in the hinge structure 1380.

The hinge cover 1365 may cover the outer surface of the hinge structure 1380. For example, the hinge cover 1365 may be provided on the rear surface of the electronic device 1300 such that the hinge structure 1380 may not be exposed to the outside of the electronic device 1300 in a folded state (e.g., the folded state of FIG. 3B) of the electronic device 1300. In an example embodiment, referring to FIG. 13, based on a cross-section perpendicular to a folding axis, the hinge cover 1365 may form a concave space and the connecting area (A3) of the heat transfer member 1390 may be provided in the concave space formed by the hinge cover 1365.

The heat shield member 1370 may be provided between the hinge cover 1365 and the heat transfer member 1390. For example, the heat shield member 1370 may be provided in the concave space formed by the hinge cover 1365 and may prevent a heat transfer between the connecting area (A3) of the heat transfer member 1390 and the hinge cover 1365. The heat shield member 1370 may be formed of a heat-insulating material to block the heat transfer. For example, the heat shield member 1370 may be formed of a material (e.g., sponge, urethane foam, and polyethylene (PE) foam) in which bubbles are formed.

In an example embodiment, the heat shield member 1370 may be formed in a form of a sheet to not interfere with a folding motion of the electronic device 1300. According to the above structure, through the heat shield member 1370, it is possible to prevent heat from the heat transfer member 1390 from being dissipated to the outside of the electronic device 1300 through the hinge cover 1365 or to prevent the heat from being transferred to a body of a user in contact with the hinge cover 1365.

Figure 14A:
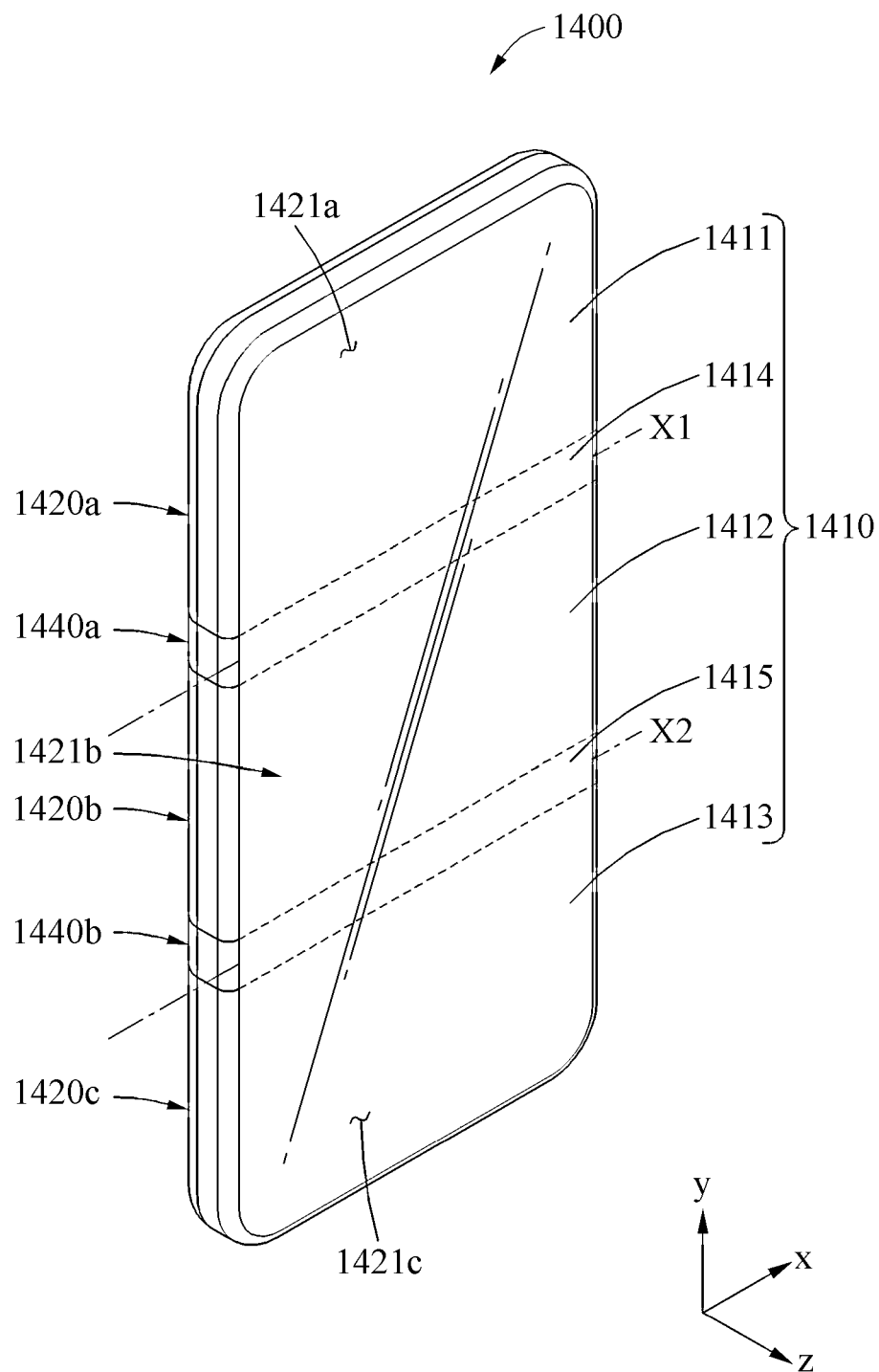
FIG. 14A is a perspective view illustrating an unfolded state of an electronic device according to an embodiment of the disclosure.

FIG. 14A is a perspective view illustrating an unfolded state of an electronic device according to an embodiment of the disclosure.

Figure 14B:
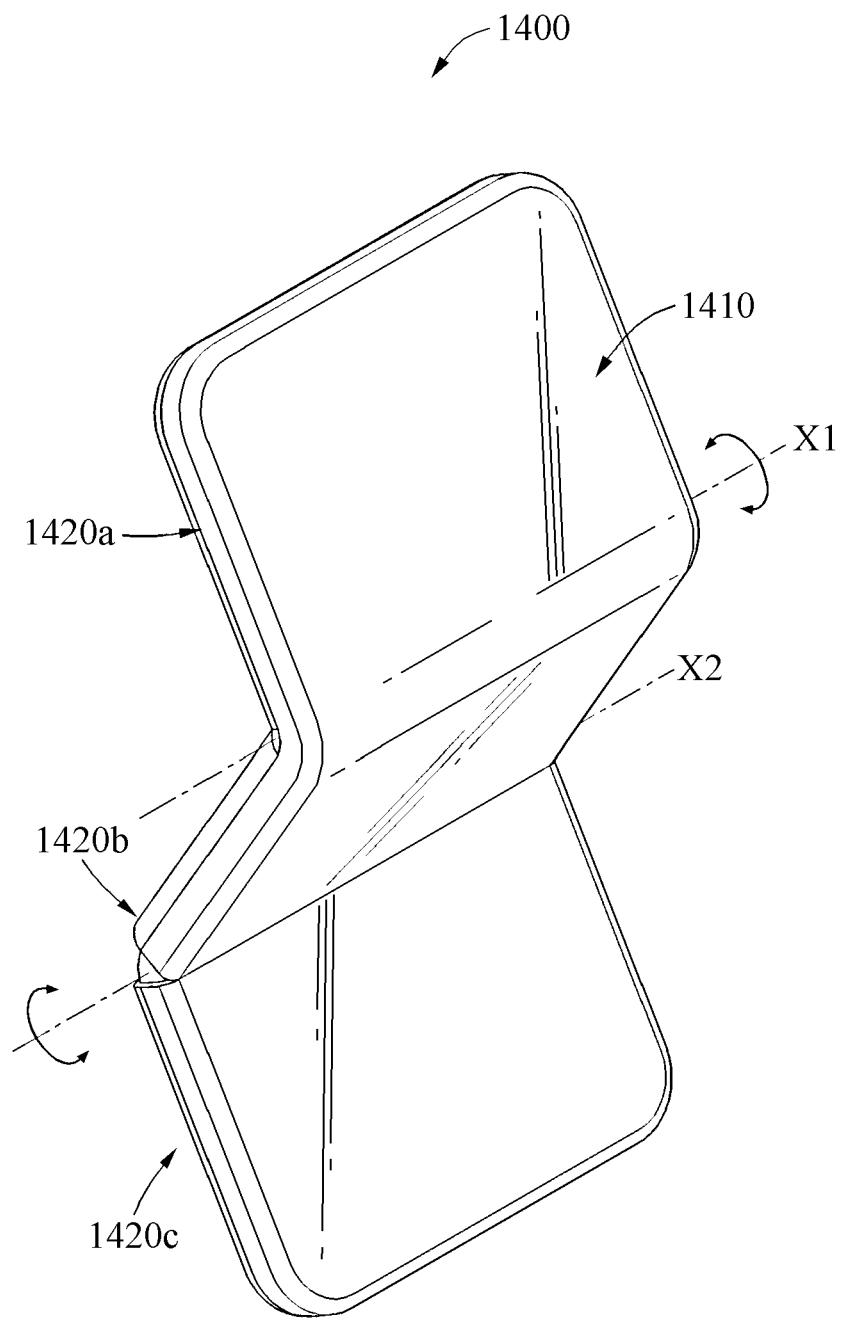
FIG. 14B is a perspective view illustrating a folded state of an electronic device according to an embodiment of the disclosure.

FIG. 14B is a perspective view illustrating a folded state of an electronic device according to an embodiment of the disclosure.

Figure 15:
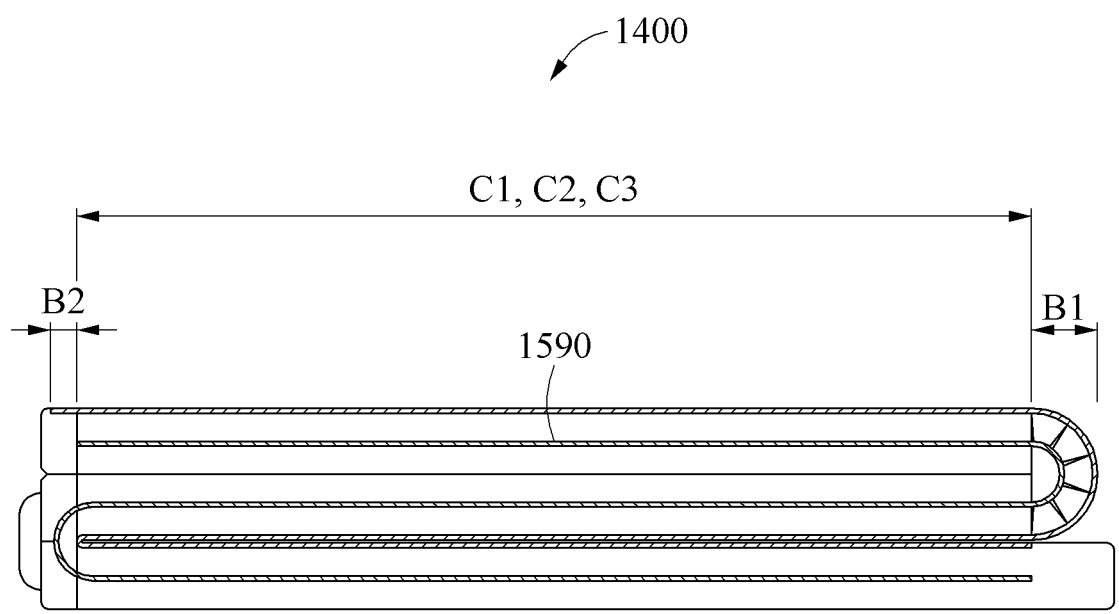
FIG. 15 is a cross-sectional view illustrating an arrangement state of a heat transfer member in a folded state of an electronic device according to an embodiment of the disclosure.

FIG. 15 is a cross-sectional view illustrating an arrangement state of a heat transfer member in a folded state of an electronic device according to an embodiment of the disclosure.

Referring to FIGS. 14A, 14B, and 15, an electronic device 1400 (e.g., the electronic device 101 of FIG. 1) according to an example embodiment may ensure a high portability by implementing a folding motion multiple times through a plurality of folding axes (X1 and X2). In an example embodiment, the electronic device 1400 may include a plurality of housings 1420a, 1420b, and 1420c, one or more hinge structures 1440a and 1440b configured to foldably connect adjacent housings, a display 1410, and a heat transfer member 1590 provided in the electronic device 1400 and configured to perform a heat transfer between a plurality of housings 1420a, 1420b, and 1420c.

In an example embodiment, the plurality of housings 1420a, 1420b, and 1420c may be interconnected to form an appearance of the electronic device 1400. For example, the electronic device 1400 may include the first housing 1420a, the second housing 1420b, and the third housing 1420c. The first housing 1420a, the second housing 1420b, and the third housing 1420c may form a first space 1421a, a second space 1421b, and a third space 1421c in which part elements of the electronic device 1400 may be provided, respectively.

In an example embodiment, the one or more hinge structure 1440a and 1440b may foldably connect a single pair of adjacent housings. For example, the one or more hinge structures 1440a and 1440b may include the first hinge structure 1440a configured to foldably connect the first housing 1420a and the second housing 1420b based on the first folding axis (X1) and the second hinge structure 1440b configured to foldably connect the second housing 1420b and the third housing 1420c based on the second folding axis (X2). In an example embodiment, the first folding axis (X1) and the second folding axis (X2) may be parallel to each other. In an example embodiment, referring to FIG. 14B, a folding direction of the first housing 1420*a* and the second housing 1420*b* through the first folding axis (X1) may be opposite to a folding direction of the second housing 1420*b* and the third housing 1420*c* through the second folding axis (X2). On the contrary, unlike this, the folding direction of the first housing 1420*a* and the second housing 1420*b* through the first folding axis (X1) may be the same as the folding direction of the second housing 1420*b* and the third housing 1420*c* through the second folding axis (X2).

In an example embodiment, the display 1410 may be provided on the front surface of the electronic device 1400. For example, the display 1410 may be provided to cover at least a partial area of the front surface of the plurality of housings 1420*a*, 1420*b*, and 1420*c* in an unfolded state of the electronic device 1400 of FIG. 14A. In an example embodiment, at least a portion of the display 1410 may be transformed according to a folding motion of the electronic device 1400. For example, the display 1410 may include a first area 1411 provided on the front surface of the first housing 1420*a*, a second area 1412 provided on the front surface of the second housing 1420*b*, and a third area 1413 provided on the front surface of the third housing 1420*c*. In this case, the display 1410 may include a first folding area 1414 provided between the first area 1411 and the second area 1412 and in which the first folding axis (X1) is positioned and a second folding area 1415 provided between the second area 1412 and the third area 1413 and in which the second folding axis (X2) is positioned. In an example embodiment, the display 1410 may be folded or unfolded in response to a folding motion of the electronic device 1400 in such a manner that a shape of at least a portion of the first folding area 1414 or the second folding area 1415 is transformed according to the folding motion of the electronic device 1400.

Referring to FIG. 15, the heat transfer member 1590 may be provided in the electronic device 1400. In an example embodiment, the heat transfer member 1590 may be provided to cross the plurality of housings 1420*a*, 1420*b*, and 1420*c* and may perform a heat transfer function between the plurality of housings 1420*a*, 1420*b*, and 1420*c*. In an example embodiment, the overall shape of the heat transfer member 1590 may be transformed in response to a folding motion of the electronic device 1400, that is, a folding motion between the plurality of housings 1420*a*, 1420*b*, and 1420*c*.

In an example embodiment, the heat transfer member 1590 may include a plurality of heat transfer areas (C1, C2, C3) provided at intervals and one or more connecting areas (B1, B2) that foldably connect adjacent heat transfer areas (C1, C2, C3). In this case, the number of heat transfer areas (C1, C2, C3) may be one more than the number of connecting areas B1, B2. For example, when the number of heat transfer areas (C1, C2, C3) is n (here, n denotes an integer of 2 or more), the number of connecting areas B1, B2 may be n−1 (here, n denotes an integer of 2 or more).

In an example embodiment, the plurality of heat transfer areas (C1, C2, C3) may be respectively provided in the spaces 1421*a*, 1421*b*, and 1421*c* respectively formed by the plurality of housings 1420*a*, 1420*b*, and 1420*c*. For example, the heat transfer member 1590 may include a first heat transfer area (C1) provided in the first space 1421*a* formed by the first housing 1420*a*, a second heat transfer area (C2) provided in the second space 1421*b* formed by the second housing 1420*b*, and a third heat transfer area (C3) provided in the third space 1421 *c* formed by the third housing 1420*c*. In an example embodiment, both sides of each of the one or more connecting areas (B1, B2) may connect a single pair of adjacent heat transfer areas (C1, C2, C3). For example, the one or more connecting areas (B1, B2) may include a first connecting area (B1) configured to foldably connect the first heat transfer area (C1) and the second heat transfer area (C2) and a second connecting area (B2) configured to foldably connect the second heat transfer area (C2) and the third heat transfer area (C3). In an example embodiment, each of the one or more connecting areas (B1, B2) may be provided to the one or more hinge structures 1440*a* and 1440*b*. For example, the first connecting area (B1) may be provided to the first hinge structure 1440*a*, and the second connecting area (B2) may be provided to the second hinge structure 1440*b*. In an example embodiment, the connecting areas (B1 and B2) may be formed to be bendable such that relative positions of the heat transfer areas (C1, C2, C3) connected to both sides may be changed in response to a folding motion of the electronic device 1400.

In an example embodiment, the heat transfer member 1590 may include a different material for each area. For example, the heat transfer area C1, C2, C3 of the heat transfer member 1590 may include a metallic material (e.g., copper) with high thermal conductivity and the connecting area B1, B2 may include a bendable flexible material (e.g., UTG, PI, or carbon fiber composite material).

Figure 16:
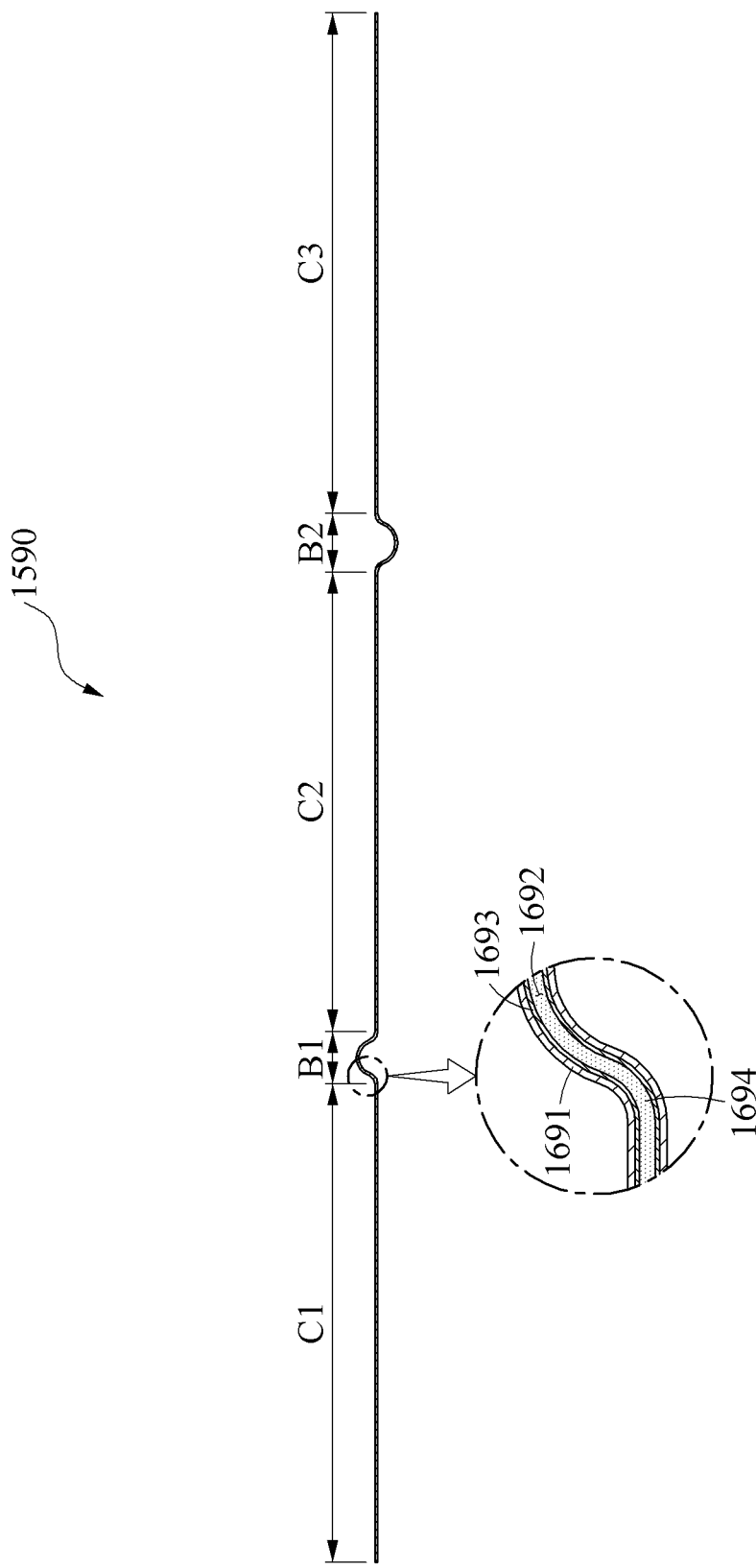
FIG. 16 is a cross-sectional view of a heat transfer member according to an embodiment of the disclosure.

FIG. 16 is a cross-sectional view of the heat transfer member 1590 according to an embodiment of the disclosure.

Referring to FIG. 16, the heat transfer member 1590 according to an example embodiment may perform a heat dissipation function in an internal space of an electronic device (e.g., the electronic device 1400 of FIG. 15) in which the heat transfer member 1590 is provided, through a heat transfer between a plurality of heat transfer areas (C1, C2, C3) and connecting areas (B1, B2). In an example embodiment, the heat transfer member 1590 may include a heat transfer space 1692, a cover 1691, a heat transfer fluid, and a wick structure 1693.

In an example embodiment, the heat transfer space 1692 may be formed in the heat transfer member 1590 such that the plurality of heat transfer areas (C1, C2, C3) and the one or more connecting areas (B1, B2) may connect each other. That is, the heat transfer space 1692 may be integrally formed in the heat transfer member 1590 along all the plurality of heat transfer areas (C1, C2, C3) and the one or more connecting areas (B1, B2) that connect the plurality of heat transfer areas (C1, C2, C3).

In an example embodiment, the cover 1691 may surround and seal the heat transfer space 1692 and may form an appearance of the heat transfer member 1590. In an example embodiment, the cover 1691 may be formed of a different material for each area of the heat transfer member 1590. For example, the heat transfer areas (C1, C2, C3) of the cover 1691 may be formed of a metallic material with high thermal conductivity and the connecting areas (B1, B2) of the cover 1691 may be formed of a bendable flexible material. In an example embodiment, when a material of the cover 1691 is different for each area of the heat transfer member 1590, portions of the cover 1691 corresponding to the respective areas of the heat transfer member 1590 connected to each other may be bonded to each other.

In an example embodiment, a heat transfer fluid may be accommodated in the heat transfer space 1692. In this case, the heat transfer fluid may move between the plurality of heat transfer areas (C1, C2, C3) through the heat transfer space 1692. In an example embodiment, when the respective heat transfer areas (C1, C2, C3) of the heat transfer member 1590 are provided in spaces respectively formed by the respective housings of the electronic device, the heat transfer fluid may perform a heat transfer while moving between the spaces formed by the respective housings through the heat transfer space 1692. In an example embodiment, the heat transfer fluid may undergo a phase change according to a temperature. For example, the heat transfer fluid may vaporize by absorbing heat or may liquefy by dissipating the heat.

The wick structure 1693 may be formed on an inner wall of the heat transfer space 1692, that is, the inner surface of the cover 1691. The wick structure 1693 may move the fluid in a liquid state through a capillary action. In an example embodiment, the wick structure 1693 may dissipate heat to a surrounding and may move the heat transfer fluid in a liquescent state within the heat transfer space 1692. According to the above structure, the heat transfer fluid may distribute the heat to the respective areas of the heat transfer member 1590 by absorbing heat from a high temperature area of the heat transfer member 1590 and transitioning the heat to a gaseous state and then moving to another area along the heat transfer space 1692 and dissipating the heat in a low temperature area of the heat transfer member 1590 and transitioning the same to a liquid state and then moving to another area along the wick structure 1693.

Therefore, the heat transfer member 1590 may perform a heat dissipation function between the plurality of heat transfer areas (C1, C2, C3) through heat-conduction through the cover 1691 and, at the same time, may perform a secondary heat dissipation function through a phase change and migration of the heat transfer fluid. In particular, since the heat transfer fluid moves along the heat transfer space 1692 that is integrally formed to cross a plurality of areas of the electronic device, the heat transfer may be effectively performed between the respective areas of the electronic device in which the heat transfer member 1590 is provided.

The electronic device 300 according to various example embodiments may include the display 330 including the first area 331*a* and the second area 331*b*, the first housing 310 configured to support the first area 331*a* and to form the first space 311*a*, the second housing 320 configured to support the second area 331*b* and to form the second space 321*a*, the hinge structure 380 configured to foldably connect the first housing 310 and the second housing 320 based on the folding axis (A) and to allow the first area 331*a* and the second area 331*b* to be in a first state in which the first area 331*a* and the second area 331*b* form substantially the same plane or in a second state in which the first area 331*a* and the second area 331*b* face each other, and the heat transfer member 390 provided to extend from the first space 311*a* to the second space 321*a* through the hinge structure 380 and configured to perform a heat transfer between the first space 311*a* and the second space 321*a*. The heat transfer member 390 may include the first heat transfer area (A1) provided in the first space 311*a*, the second heat transfer area (A2) provided in the second space 321*a*, and the connecting area (A3) configured to connect the first heat transfer area (A1) and the second heat transfer area (A2) and provided to the hinge structure 380. The heat transfer member 390 may include the heat transfer space 792 internally formed and connected from the first heat transfer area (A1) to the second heat transfer area (A2) through the connecting area (A3) and the cover 791 configured to surround the heat transfer space 792 and to form an appearance.

In an example embodiment, the heat transfer member 390 may be formed to be bendable in response to a folding motion of the first housing 310 and the second housing 320 in the connecting area (A3).

In an example embodiment, the cover 791 may include a metallic material in the first heat transfer area (A1) and the second heat transfer area (A2), and may include a flexible material in the connecting area (A3).

In an example embodiment, based on the cross-section perpendicular to the folding axis (A), the cover 891 may include the first cover portion 8911 provided in the first heat transfer area (A1), the second cover portion 8912 provided in the first heat transfer area (A1) and provided to face the first cover portion 8911 based on the heat transfer space 892, the third cover portion 8913 provided in the second heat transfer area (A2), the fourth cover portion 8914 provided in the second heat transfer area (A2) and provided to face the third cover portion 8913 based on the heat transfer space 892, the first connecting portion 8915 of which at least a portion is provided in the connecting area (A3) and of both sides are overlappingly connected to the first cover portion 8911 and the third cover portion 8913, respectively, and the second connecting portion 8916 of which at least a portion is provided in the connecting area (A3), provided to face the first connecting portion 8915 based on the heat transfer space 892, and of which both sides are overlappingly connected to the second cover portion 8912 and the fourth cover portion 8914, respectively.

In an example embodiment, the first connecting portion 8915 may be connected to cover the outer surface of the first cover portion 8911 and the third cover portion 8913, and the second connecting portion 8916 may be connected to cover the outer surface of the second cover portion 8912 and the fourth cover portion 8914.

In an example embodiment, both ends of the first connecting portion 8915' may be in a shape that engages with ends of the first cover portion 8911' and the third cover portion 8913' such that the outer surface of a portion connected to the first cover portion 8911' and the third cover portion 8913' is not stepped, and both ends of the second connecting portion 8916' may be in a shape that engages with ends of the second cover portion 8912' and the fourth cover portion 8914' such that the outer surface of a portion connected to the second cover portion 8912' and the fourth cover portion 8914' is not stepped.

In an example embodiment, the cover 991 may further include the third connecting portion 9917 of which at least a portion is provided in the connecting area (A3) and of which both sides are connected to cover the inner surface of the first cover portion 9911 and the third cover portion 9913, respectively, and the fourth connecting portion 9918 of which at least a portion is provided in the connecting area (A3), provided to face the third connecting portion 9917 based on the heat transfer space 992, and of which both sides are connected to cover the inner surface of the second cover portion 9912 and the fourth cover portion 9914, respectively.

In an example embodiment, the heat transfer member 1290 may further include the plurality of fillers 1296 provided in the heat transfer space 1292.

In an example embodiment, based on the cross-section perpendicular to the folding axis (A), a distance (d2) between the plurality of fillers 1296 provided in the connecting area (A3) may be wider than a distance (d1) between the plurality of fillers 1296 provided in each of the first heat transfer area (A1) and the second heat transfer area (A2).

In an example embodiment, the heat transfer member 1190 may include a plurality of bending portions formed in the connecting area (A3) and configured to bend based on a bending shaft parallel to the folding axis.

In an example embodiment, the cover 1091 may be formed of a metallic material and the thickness (W2) of the connecting area (A3) may be formed to be less than the thickness (W1) of the first heat transfer area (A1) and the second heat transfer area (A2).

In an example embodiment, the heat transfer member 1090 may further include the reinforcement member 1095 provided in the connecting area (A3) and configured to attach to the outer surface of the cover 1091.

In an example embodiment, the electronic device 1300 may include the hinge cover 1365 configured to cover the outer surface of the hinge structure 1380 and the heat shield member 1370 provided between the hinge cover 1365 and the heat transfer member 1390 and configured to block heat transferred from the heat transfer member 1390 to the hinge cover 1365.

In an example embodiment, the heat transfer member 790 may further include the heat transfer fluid 794 accommodated in the heat transfer space 792 and configured to undergo a phase change to a liquid state or a gaseous state according to a temperature and the wick structure 793 provided on the inner surface of the cover 791 and configured to move the heat transfer fluid 794 in the liquid state.

In an example embodiment, the electronic device 600 may further include the fastening member 697 configured to fasten at least a portion of the first heat transfer area (A1) and the second heat transfer area (A2) adjacent to the connecting area (A3) to the first housing 610 and the second housing 620, respectively.

The electronic device 300 according to various example embodiments may include the display 330 including the first area 331a and the second area 331b foldable through the folding axis (A), the first support plate 361 positioned in a rear direction of the first area 331a, the second support plate 362 positioned in the rear direction of the second area 331b, the hinge housing to which the hinge 364 for rotating the first support plate 361 and the second support plate 362 based on the folding axis (A) is fastened, provided along the folding axis (A), and configured to connect the first support plate 361 and the second support plate 362, the first PCB 371 provided to face the first area 331a based on the first support plate 361, the second PCB 372 provided to face the second area 331b based on the second support plate 362, the heat transfer member 390 including the first heat transfer area (A1) provided on the rear surface of the first area 331a, the second heat transfer area (A2) provided on the rear surface of the second area 331b, and the connecting area (A3) configured to connect the first heat transfer area (A1) and the second heat transfer area (A2) across the hinge housing. The heat transfer member 390 may include the heat transfer space 1692 internally formed and connected with the first heat transfer area (A1) and the second heat transfer area (A2) through the connecting area (A3) and the cover 1691 configured to seal the heat transfer space 1692. The first heat transfer area (A1) and the second heat transfer area (A2) of the cover 1691 may include a metallic material, and the connecting area (A3) may include a flexible material.

In an example embodiment, the heat transfer member 690 may further include the heat transfer fluid 1694 accommodated in the heat transfer space 1692 and configured to undergo a phase change according to a temperature and the wick structure 1693 provided in the heat transfer space 1692 and configured to move the heat transfer fluid 1694 in a liquid state.

In an example embodiment, the electronic device 500 may further include the first front heat dissipation member 581a and the second front heat dissipation member 581b provided between the display 530 and the heat transfer member 590 and configured to form heat transfer paths between the first area and the second area and the heat transfer member 590.

In an example embodiment, the electronic device 500 may further include the first rear heat dissipation member 582a configured to form a heat transfer path between the first heat transfer area (A1) and the first PCB 571 and the second rear heat dissipation member 582b configured to form a heat transfer path between the second heat transfer area (A2) and the second PCB 572.

The heat transfer member 1590 provided in the electronic device according to various example embodiments may include the plurality of heat transfer areas (C1, C2, C3) spaced apart from each other, at least one connecting area (B1, B2) configured to foldably connect a single pair of the heat transfer areas that are adjacent to each other, the heat transfer space 1692 internally formed for mutual connection between the plurality of heat transfer areas (C1, C2, C3) and the at least one connecting area (B1, B2), the heat transfer fluid accommodated in the heat transfer space 1692 and configured to undergo a phase change according to a temperature, and the wick structure 1693 provided along the inner surface of the heat transfer space 1692 and configured to move the heat transfer fluid. The heat transfer area (C1, C2, C3) may include a metallic material and the connecting area (B1, B2) may include a bendable flexible material.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
a display comprising a first area and a second area foldable through a folding axis;
a first support plate positioned in a rear direction of the first area;
a second support plate positioned in a rear direction of the second area;
a hinge housing to which a hinge for rotating the first support plate and the second support plate based on the folding axis is fastened, provided along the folding axis, and connecting the first support plate and the second support plate;
a first printed circuit board (PCB) provided to face the first area based on the first support plate;
a second PCB provided to face the second area based on the second support plate; and
a heat transfer member comprising:
a first heat transfer area provided on a rear surface of the first area;
a second heat transfer area provided on the rear surface of the second area;
a connecting area connecting the first heat transfer area and the second heat transfer area across the hinge housing;
a heat transfer space internally formed and connected with the first heat transfer area and the second heat transfer area through the connecting area;
a cover configured to seal the heat transfer space; and a first heat transfer area and a second heat transfer area of the cover comprise a metallic material and the connecting area comprises a flexible material.

2. The electronic device of claim 1, wherein the heat transfer member further comprises:
- a heat transfer fluid accommodated in the heat transfer space and undergoing a phase change according to a temperature; and
- a wick structure provided in the heat transfer space and configured to move the heat transfer fluid in a liquid state.

3. The electronic device of claim 1, further comprising:
a first front heat dissipation member and a second front heat dissipation member provided between the display and the heat transfer member and forming heat transfer paths between the first area and the second area and the heat transfer member, respectively.

4. The electronic device of claim 1, further comprising:
a first rear heat dissipation member forming a heat transfer path between the first heat transfer area and the first PCB; and
a second rear heat dissipation member forming a heat transfer path between the second heat transfer area and the second PCB.

\* \* \* \* \*